（12） United States Patent
Yamaguchi

(10) Patent No.: US 9,502,905 B2
(45) Date of Patent: Nov. 22, 2016

(54) SIGNAL AND POWER TRANSMISSION SYSTEM

(71) Applicant: DENSO CORPORATION, Kariya, Aichi-pref. (JP)

(72) Inventor: Nobuhisa Yamaguchi, Toyokawa (JP)

(73) Assignee: DENSO CORPORATION, Kariya (JP)

( * ) Notice: Subject to any disclaimer, the term of this patent is extended or adjusted under 35 U.S.C. 154(b) by 1039 days.

(21) Appl. No.: 13/627,038

(22) Filed: Sep. 26, 2012

(65) Prior Publication Data

US 2013/0082516 A1    Apr. 4, 2013

(30) Foreign Application Priority Data

Sep. 26, 2011  (JP) ................................. 2011-208540
May 28, 2012   (JP) ................................. 2012-120878

(51) Int. Cl.
*H02J 4/00*     (2006.01)
*H04B 3/54*     (2006.01)

(52) U.S. Cl.
CPC .............. *H02J 4/00* (2013.01); *H04B 3/548* (2013.01); *H04B 2203/5475* (2013.01)

(58) Field of Classification Search
CPC ........... H02J 5/005; H02J 7/025; H02J 17/00; H02J 4/00; H01F 38/14; B60L 11/182; H04B 3/548; H04B 2203/5475
USPC ........................................................ 307/104
See application file for complete search history.

(56) References Cited

U.S. PATENT DOCUMENTS

| 4,673,888 | A | * | 6/1987  | Engelmann ........... H03F 1/0227 323/301 |
| 4,748,532 | A |   | 5/1988  | Commander et al. |
| 5,586,019 | A | * | 12/1996 | Mukogawa ....... H02M 3/33561 323/249 |

(Continued)

FOREIGN PATENT DOCUMENTS

| JP | S60-183980 | 9/1985 |
| JP | 03-007495  | 1/1991 |

(Continued)

OTHER PUBLICATIONS

Office Action (1 page) dated Feb. 12, 2014, issued in corresponding Japanese Application No. 2012-120878 and English translation (1 page).

*Primary Examiner* — Thienvu Tran
*Assistant Examiner* — Brian K Baxter
(74) *Attorney, Agent, or Firm* — Nixon & Vanderhye P.C.

(57) ABSTRACT

In a signal and power transmission system, a primary coil and a secondary coil magnetically coupled to the primary coil and connected to an electrical path are provided. An encoder encodes a target signal to be transmitted to produce a pulse code signal, and a voltage applying unit applies a voltage signal based on the pulse code signal to the primary coil as an input voltage signal. A decoder decodes an output voltage signal induced in the secondary coil using a variation in the output voltage signal into a decoded signal corresponding to the target signal. The output voltage signal is induced in the secondary coil based on the input voltage signal. A rectifier rectifies a current flowing through the electrical path connected to the secondary coil according to the output voltage signal induced in the secondary coil, thus outputting a rectified current as power.

28 Claims, 18 Drawing Sheets

(56) References Cited

U.S. PATENT DOCUMENTS

| | | | | |
|---|---|---|---|---|
| 5,917,716 A | * | 6/1999 | Cho | H02H 7/1227 348/E5.127 |
| 6,211,735 B1 | * | 4/2001 | Luu | H03F 3/2171 330/10 |
| 6,294,957 B1 | * | 9/2001 | Luu | H03F 3/2171 330/10 |
| 6,563,722 B1 | * | 5/2003 | John | H02J 3/1814 363/54 |
| 7,489,526 B2 | | 2/2009 | Chen et al. | |
| 2004/0223277 A1 | * | 11/2004 | Cheng | H02M 1/096 361/100 |
| 2006/0039169 A1 | | 2/2006 | Chen et al. | |
| 2006/0274559 A1 | * | 12/2006 | Saeueng | H02M 3/33561 363/21.06 |
| 2007/0009052 A1 | * | 1/2007 | Hershbarger | H04B 3/548 375/258 |
| 2007/0013486 A1 | * | 1/2007 | Yeoh | G06K 19/0707 340/10.34 |
| 2010/0308873 A1 | * | 12/2010 | Kure | H02M 7/5387 327/109 |
| 2011/0012542 A1 | * | 1/2011 | Inamura | H02M 1/08 318/139 |

FOREIGN PATENT DOCUMENTS

| | | |
|---|---|---|
| JP | H06-078526 | 3/1994 |
| JP | H07-307653 | 11/1995 |
| JP | H08-242590 | 9/1996 |
| JP | P2001-145362 A | 5/2001 |
| JP | 2006-109686 | 4/2006 |
| JP | 2006-280100 | 10/2006 |
| JP | 2008-511272 | 4/2008 |

\* cited by examiner $$T0 : 10 \cdot T0 = \frac{DT}{N}$$

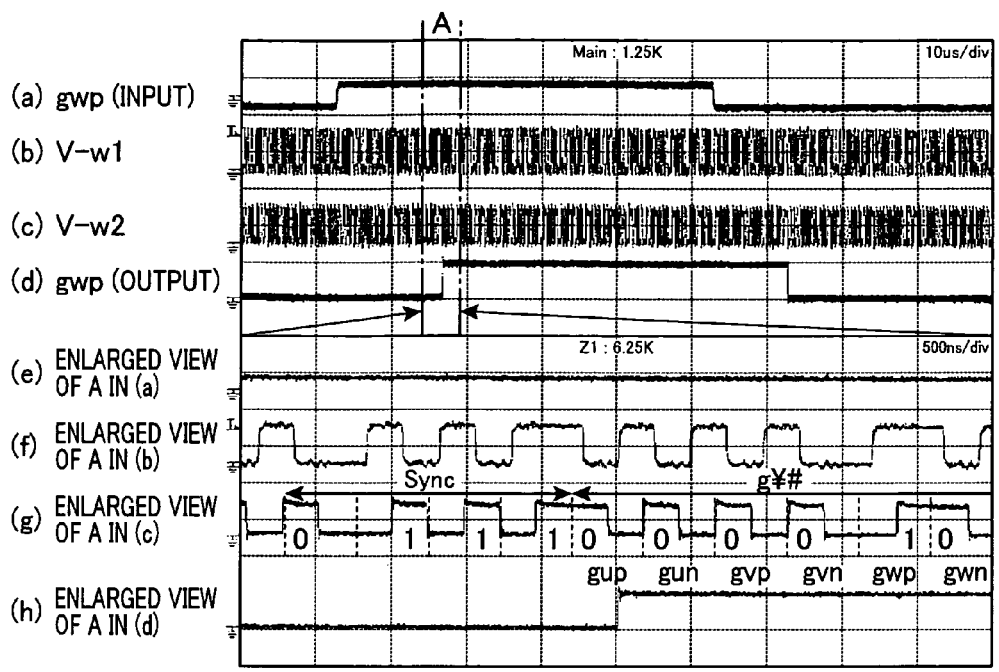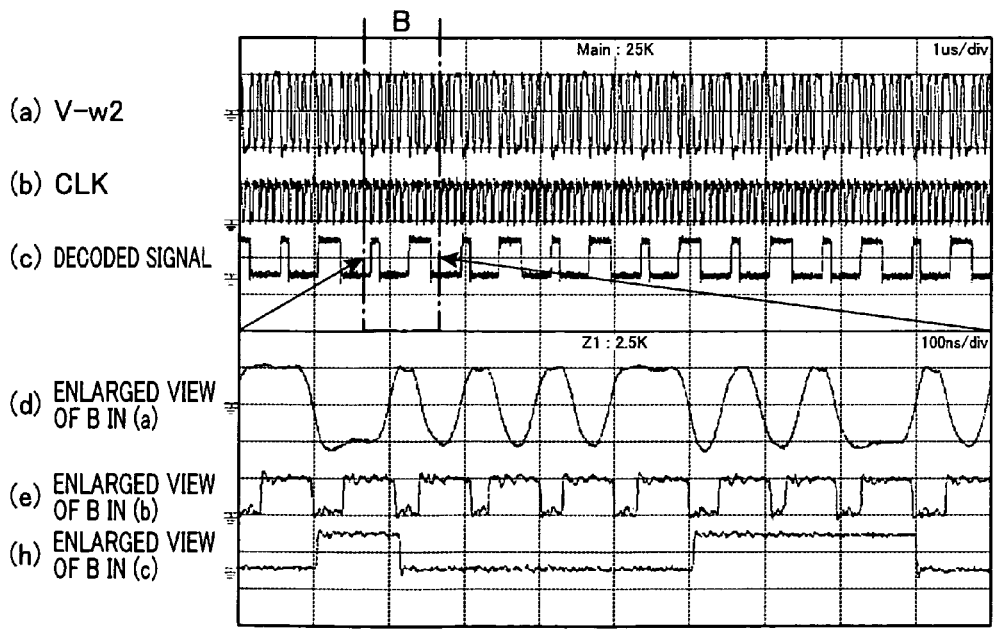

FIG.21A
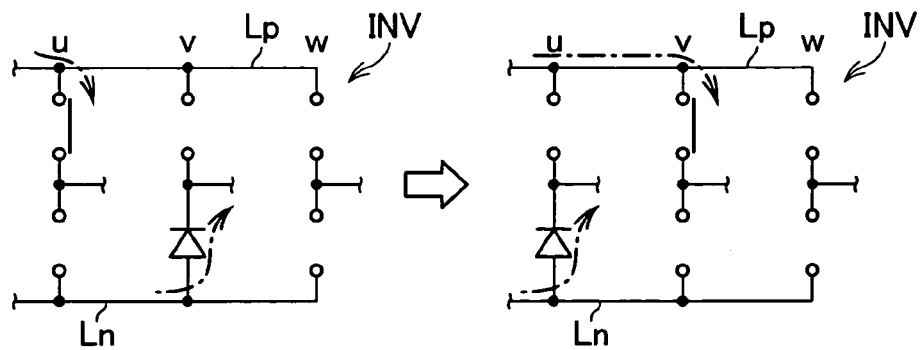
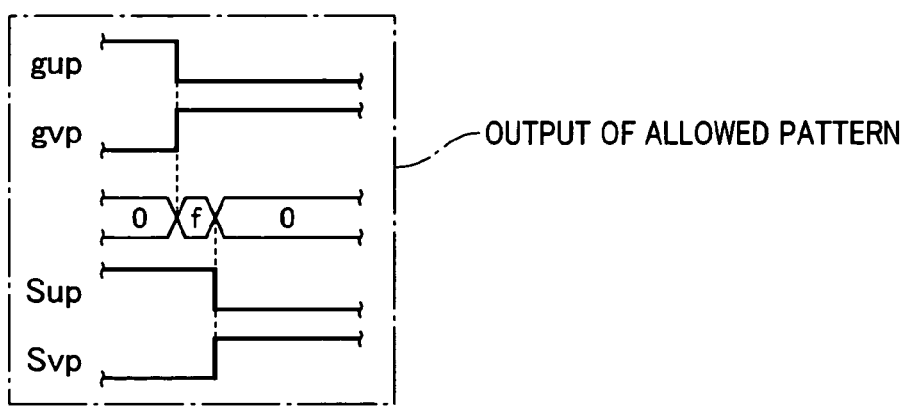
OUTPUT OF ALLOWED PATTERN
FIG.21B
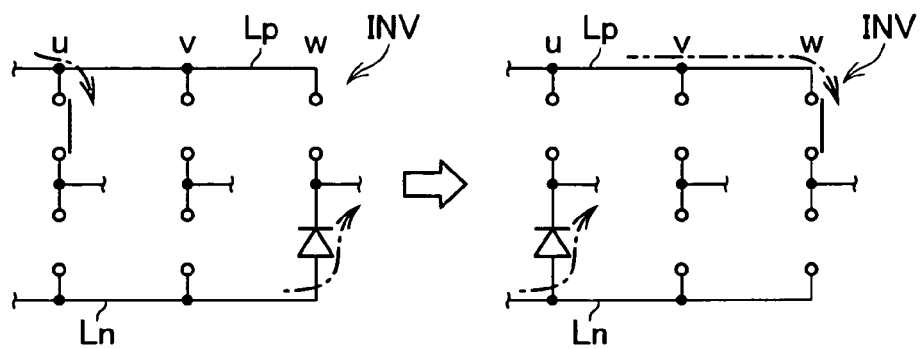
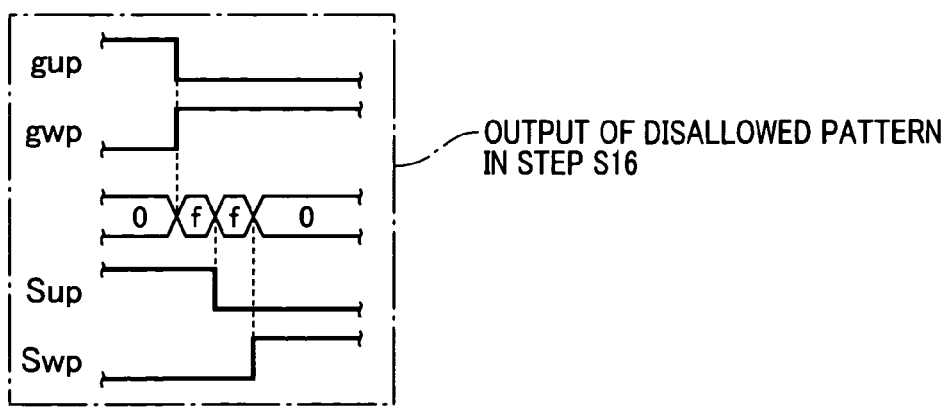
OUTPUT OF DISALLOWED PATTERN IN STEP S16

SIGNAL AND POWER TRANSMISSION SYSTEM

CROSS REFERENCE TO RELATED APPLICATIONS

This application is based on and claims the benefit of priority from Japanese Patent Applications 2011-208540 and 2012-120878 filed on Sep. 26, 2011 and May 28, 2012, respectively, the disclosure of each of which is incorporated in its entirety herein by reference.

TECHNICAL FIELD

The present disclosure relates to signal and power transmission systems for transmitting signals and power to a destination.

BACKGROUND

Japanese Patent Publication No. 3417127 discloses a drive circuit for a power converter. In the known drive circuit, a first frequency signal and a second frequency signal are outputted while they are switched at every preset period. The first and second frequency signals are alternately applied to the primary coil of a transformer, so that different voltages based on the first and second frequency signals are alternately induced across the secondary coil of the transformer with the secondary coil and the primary coil being electrically insulated.

The known drive circuit uses output of the secondary coil of the transformer as power for driving the control terminal of a switching element of the power converter. Specifically, to the secondary coil of the transformer, a series circuit, which is comprised of a pair of first and second capacitors connected to each other in series, is connected via a rectifier. That is, different first and second voltages are alternately applied, with a regular cycle, to the first and second capacitors, i.e. if in one cycle the first voltage is applied to the first capacitor and the second voltage is applied to the second capacitor, then in the next cycle, the second voltage is applied to the first capacitor and the second voltage is applied to the second capacitor. The first voltage means the potential across the first capacitor relative to the connection point between the first and second capacitors, and the second voltage means the potential across the second capacitor relative the connection point.

According to results of comparison between a reference voltage and the potential of the connection point between the first and second capacitors, a first drive signal with a high level and a second drive signal with a low level are alternately generated to be applied to a switching element of the power converter. While the first drive signal with the high level is being generated, the switching element is on, and while the second drive signal with the low level is being generated, the switching element is off. That is, the known power converter is configured to repeatedly turn on or off the switching element of the power converter.

SUMMARY

However, when the known drive circuit is used as a drive circuit for each switching element of a three-phase inverter, the transformer needs be provided for at least each leg of the power converter. That is, an increase in the number of elements to be driven by the drive circuit may increase the size of the drive circuit and the number of components of the drive circuit.

In the known drive circuit, the first voltage across the first capacitor relative to the connection point between the first and second capacitors and the second voltage across the second capacitor relative to the connection point therebetween are changed every preset period that is identical to the switching period of the first and second frequency signals. Thus, if another power source is required for other uses other than driving the switching element in the known drive circuit, it may be difficult to use the pair of first and second capacitors, resulting in the need to provide another power source.

An increase in on duration or off duration to be instructed for the switching element in the known drive circuit may cause interlinkage flux to the primary coil or the secondary coil of the transformer to become excessively large, resulting in the need of upsizing of the transformer.

In view of the circumstances set forth above, one aspect of the present disclosure seeks to provide signal and power transmission systems for transmitting signals and power to a destination, which are newly created by the inventor of this application.

Specifically, an alternative aspect of the present disclosure aims to provide such signal and power transmission systems, which are capable of addressing the needs set forth above.

According to an exemplary aspect of the present disclosure, there is provided a signal and power transmission system. The system includes a primary coil, a secondary coil magnetically coupled to the primary coil and connected to a first electrical path, and an encoder configured to encode a target signal to be transmitted to produce a pulse code signal. The system includes a voltage applying unit configured to apply a voltage signal based on the pulse code signal to the primary coil as an input voltage signal. The system includes a decoder configured to decode an output voltage signal induced in the secondary coil using a variation in the output voltage signal into a decoded signal corresponding to the target signal. The output voltage signal is induced in the secondary coil based on the input voltage signal. The system includes a rectifier configured to rectify a current flowing through the first electrical path connected to the secondary coil according to the output voltage signal induced in the secondary coil.

With the exemplary aspect of the present disclosure, the target signal is encoded into the pulse code signal. Thus, it is possible to easily transmit the target signal via the primary coil and the secondary coil to a given destination. Because the input voltage signal is based on the pulse code signal, the output voltage signal is a pulsed voltage signal. Thus, it is possible to easily detect the target signal based on the variation in the pulsed output voltage signal, thus easily decoding the pulsed output voltage signal into the target signal using the variation in the pulsed output voltage signal. In addition, the output voltage signal is rectified by the rectifier, so that a rectified current is generated. Thus, it is possible to use the rectified current as a DC power source in the destination.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with, reference to the accompanying drawings in which:

FIG. 6 is a timing chart schematically illustrating results of performance evaluation of the signal and power transmission system according to the first embodiment;

FIG. 7 is a timing chart schematically illustrating results of performance evaluation of the signal and power transmission system according to the first embodiment;

FIG. 21A is a timing chart schematically illustrating an allowed pattern in which the ON-to-OFF transition of a U-phase upper-arm switching element and the OFF-to-ON transition of a V-phase upper-arm switching element are allowed to simultaneously occur;

FIG. 21B is a timing chart schematically illustrating a disallowed pattern in which the ON-to-OFF transition of the U-phase upper-arm switching element and the OFF-to-ON transition of the V-phase upper-arm switching element are disallowed from occurring simultaneously;

DETAILED DESCRIPTION OF EMBODIMENT

Figure 1:
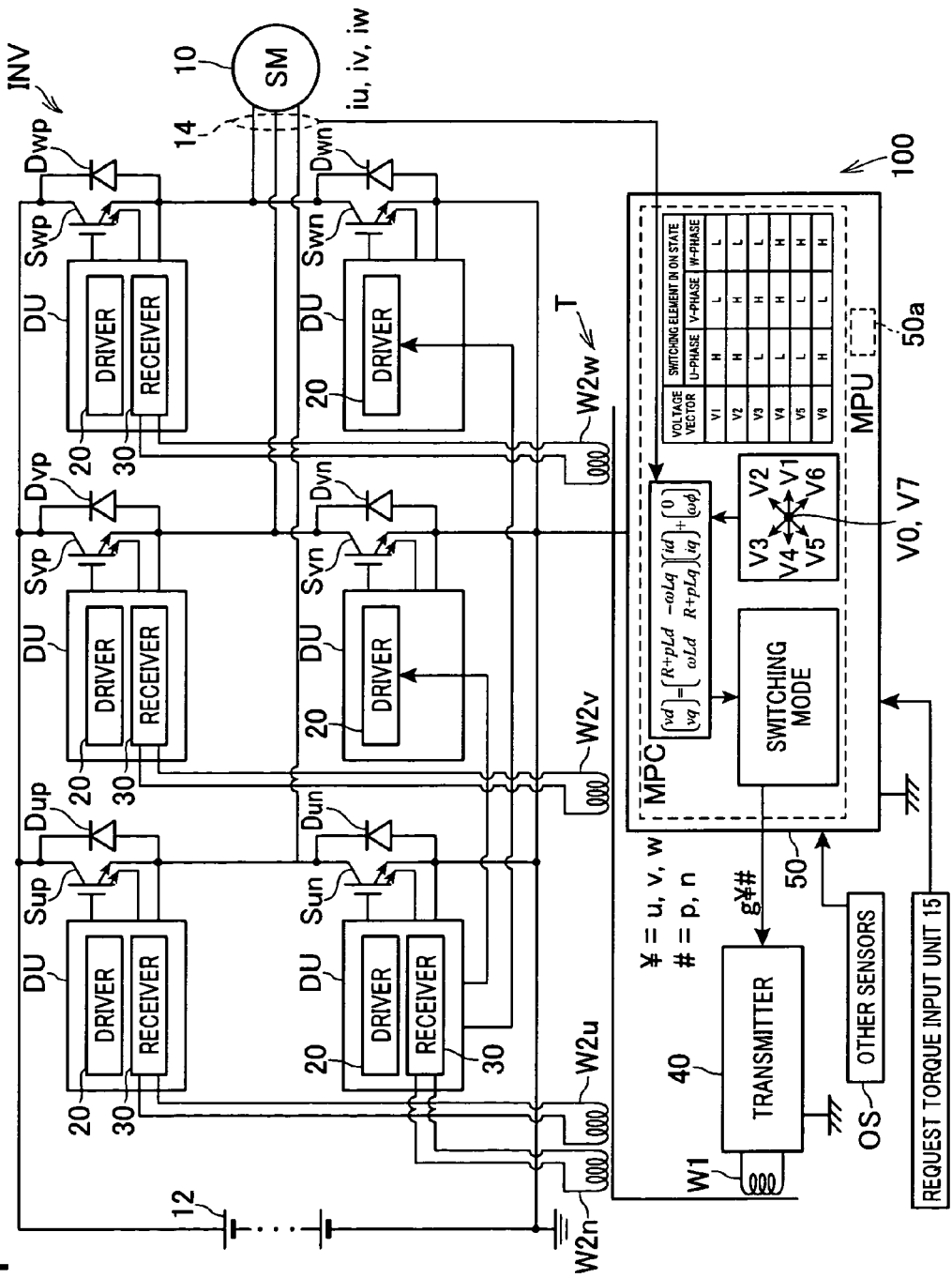
FIG. 1 is a view schematically illustrating an overall configuration of a control system for a motor-generator according to a first embodiment of the present disclosure.

Embodiments of the present disclosure will be described hereinafter with reference to the accompanying drawings. In the embodiments, like parts between the embodiments, to which like reference characters are assigned, are omitted or simplified to avoid redundant description.

First Embodiment

Referring to FIG. 1, there is illustrated a three-phase motor-generator as an example of rotating machines, referred to simply as a "motor-generator" 10, installed in, for example, a motor vehicle as a main engine according to the first embodiment. As the motor-generator 10, a motor having a salient-pole structure is used. For example, as the motor-generator 10, a three-phase SM (Synchronous Motor) is used.

In FIG. 1, there is also illustrated a control system 100. The control system 100 is equipped with an inverter INV serving as a circuit for applying a variable output voltage to the motor-generator 10, a high-voltage battery 12 as an example of DC power sources, drive units DU, a transmitter 40, a transformer T, and a microprocessor unit (MPU) 50.

To the motor-generator 10, the high-voltage battery 12 is electrically connected via the inverter INV. The high-voltage battery is for example a secondary battery with the terminal voltage, which is, for example, equal to or higher than 100 V. A median value between the positive-terminal potential and the negative-terminal potential of the high-voltage battery 12 is set to the potential of the body of the motor vehicle, so that the negative-terminal potential of the high-voltage battery 12 is set to be different from the potential of the body of the motor vehicle. This setting can be performed using, for example, a voltage divider consisting of a plurality of series-connected capacitors. Specifically, each of the connection points between the respective adjacent capacitors of the voltage divider, which divides the terminal voltage across the high-voltage battery 12, is connected to the body of the motor vehicle. This allows the negative-terminal potential of the high-voltage battery 12 to be different from the potential of the body of the motor vehicle.

For example, the motor-generator 10 is provided with an annular rotor having an iron rotor core. The iron rotor core is, for example, directly or indirectly coupled to a crankshaft of an engine installed in the motor vehicle if the motor vehicle is a hybrid vehicle.

The rotor has a salient-pole structure.

Specifically, the rotor core of the rotor is provided at its circumferential portions with at least one pair of permanent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor has a direct axis (d-axis) in line with a direction of magnetic flux created by the N pole, in other words, in line with a rotor N pole center line. The rotor also has a quadrature axis (q-axis) with a phase being $\pi/2$ radian in electrical angle leading with respect to a corresponding d-axis during rotation of the rotor. In other words, the q-axis is electromagnetically orthogonal to the d-axis.

The d and q axes constitute a d-q coordinate system (rotating coordinate system) defined in the rotor of the motor-generator 10.

An inductance Ld in the d-axis is lower than, an inductance Lq in the q-axis because the permanent magnets have a magnetic permeability constant lower than that of iron. Motors having a salient-pole structure means motors each having this inductance characteristic of the rotor.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

The stator also includes a set of three-phase windings (armature windings) wound in the stator such that the U-, V-, and W-phase windings are shifted by an electric angle of, for example, $\pi/3$ radian in phase from each other.

For example, the three-phase armature windings (U-, V-, and W-phase windings) each have one end connected to a common junction (neutral point) and the other end to a separate terminal in, for example, a star-configuration.

The motor-generator 10 is operative to receive at its three-phase windings three-phase currents to generate a rotating magnetic flux; this allows the rotor to turn based on magnetic attractive force between the rotating magnetic flux and a magnetic flux of the rotor.

The inverter INV serves as, for example, a circuit configured to output an AC (Alternating Current) voltage to be applied to the motor-generator 10. Specifically the inverter INV is designed as a three-phase inverter. The inverter INV is provided with three pairs of series-connected high- and low-side (upper- and lower-arm) switching elements Sup and Sun, Svp and Svn, and Swp and Swn. The inverter INV is also provided with flywheel diodes D¥# (¥=u, v, w, #=p, n) electrically connected in antiparallel to the corresponding switching elements S¥# (¥=v, w, #=p, n), respectively.

In the first embodiment, as the switching elements S¥# (¥=u, v, w, #=p, n), IGBTs are respectively used.

When power MOSFETs are used as the switching elements S¥#(¥=u, v, w, #=p, n), intrinsic diodes of the power MOSFETs can be used as the flywheel diodes, thus eliminating the flywheel diodes.

The three pairs of switching elements are parallely connected to each other in bridge configuration.

A connecting point through which each of the switching elements S¥p (¥=u, v, w) is connected to a corresponding one of the S¥n (¥=u, v, w) in series is connected to an output lead extending from the separate terminal of a corresponding one of the U-phase winding, V-phase winding, and W-phase winding.

One end of the series-connected switching elements of each of the three pairs, such as the drain of the corresponding high-side switching element, is connected to the positive terminal of the high-voltage battery 12. The other end of the series-connected switching elements of each of the three pairs, such as the source of the corresponding low-side switching element, is connected to the negative terminal of the high-voltage battery 12.

The control system 100 is comprised of a drive unit DU provided for each of the switching elements S¥#. Specifically, the drive unit DU for each of the switching elements S¥# is connected to the gate, i.e. on/off control terminal, of a corresponding one of the switching elements S¥#.

Particularly, each of the drive units DU for the respective switching elements S¥# is commonly equipped with a driver 20 operative to control the voltage applied to the gate of a corresponding one of the switching elements S¥#. In addition, each of the drive units DU provided for the respective upper-arm switching elements S¥p is equipped with a receiver 30 that receives an on/off drive instruction for turning on or off a corresponding one of the upper-arm switching elements S¥p. Similarly, the drive unit DU provided for the U-phase lower-arm switching element Sun is equipped with a receiver 30 that receives an on/off drive instruction for turning on or off the U-phase lower-arm switching elements Sun. By the drive unit DU provided for each of the V-phase and W-phase lower-arm switching elements Svn and Swn, signals received by the drive unit DU provided for the U-phase lower-arm switching element Sun are designed to be captured. This design is based on the fact that the action potentials of the drive units DU provided for the respective lower-arm switching elements Sun, Svn, and Swn are identical to each other.

Particularly, the driver 20 is designed to complementarily drive the high- and low-side switching element S¥# for each leg (phase). In other words, the driver 20 is designed to turn on the high-side switching element S¥p for one leg (phase) while turning off the low-side switching element S¥n for the same leg (phase), and turn off the high-side switching element S¥p for one leg (phase) while turning on the low-side switching element S¥n for the same leg (phase).

The control system 100 is equipped with, as means for detecting operating conditions of the motor-generator 10, current sensors 14.

Each of the current sensors 14 is arranged to allow measurement of a corresponding one of the instantaneous three-phase alternating current values iu, iv, and iw actually flowing through a corresponding one of the three-phase windings of the stator.

The current sensors 14 are communicable with the MPU 50, and are operative to send, to the MPU 50, the measured current values.

Values of other parameters, including a rotational angle θ of the d-axis of the rotor, defining the operating conditions of the motor-generator 10, which are measured by other sensors OS or estimated, are also sent to the MPU 50.

The MPU 50 captures the measured current values and the measured values of the other parameters. The MPU 50 is connected to a request torque input unit 15 for inputting, to the MPU 50, a request torque Tr for the motor-generator 10.

The MPU 50 is designed to individually drive, via the drive units DU provided for the respective switching elements S¥#, the switching elements S¥# based on the measured current values and the measured values of the other parameters to thereby control a controlled variable of the motor-generator 10, such as an output torque of the motor-generator 10. The microprocessor unit 50 is designed as, for example, software means designed such that a CPU runs programs stored in its memory 50a to carry out the task of controlling the controlled variable of the motor-generator 10.

Specifically, the MPU 50 is operative to adjust, based on the measured current values and the values of the other parameters, three-phase currents actually flowing through the respective three-phase windings to respective command currents required when the output torque of the motor-generator 10 is matched with the request torque Tr.

Particularly, the MPU 50 according to the first embodiment carries out model predictive control (MPC) to adjust three-phase currents actually flowing through the respective three-phase windings to respective command currents; an example of the MPC is disclosed in, for example, Japanese Patent Application Publication No. 2008-228419.

The model predictive control is designed to predict values of the three-phase currents actually flowing through the respective three-phase windings for each of a plurality of switching modes (drive modes) of the inverter INV, and select one of the plurality of switching modes. The selected one of the plurality of switching modes allows the predicted values of the three-phase currents actually flowing through the respective three-phase windings to be the closest to values of the corresponding respective command currents.

The plurality of switching modes (drive modes) of the inverter INV are defined as voltage vectors Vi that defines one of the plurality of switching modes in which the inverter INV.

Specifically, the voltage vectors Vi define on-off modes of the respective switching elements S¥# of the inverter INV, and are expressed by eight space voltage vectors V0 to V7 illustrated in FIG. 1.

Hereinafter, reference character "H" represents that the high-side switching element of a corresponding pair of the switching elements is ON, and reference character "L" represents that the low-side switching element of a corresponding pair of the switching elements is ON.

For example, the voltage vector V0 (L, L, L) expresses a switching mode in which all of the low-side switching elements S¥n are ON and all of the high-side switching elements S¥p are OFF. In addition, the voltage vector V7 (H, H, H) expresses a switching mode in which all of the high-side switching elements S¥p are ON and all of the low-side switching elements S¥n are OFF. The voltage vector V1 (H, L, L) expresses in switching mode in which the high-side switching element Sup and the low-side switching elements Svn and Swn are ON, and the low-side switching element Sun and the high-side switching elements Svp and Swp are OFF.

The voltage vectors V0 and V7 express that all of the three-phase windings are short-circuited so that line-to-line voltages between the three-phase windings of the motor-generator 10 are all zero.

In contrast, each of the remaining voltage vectors V1 to V6 express a switching mode in which at least one of the high-side switching elements and at least one of the low-side switching elements are ON. Thus, the voltage vectors V1 to V6 will be referred to as "effective voltage vectors" hereinafter.

Referring to FIG. 1, the three-phase instantaneous current values iu, iv, and iw measured by the current sensors 14 are inputted to the MPU 50. The MPU 50 converts the received three-phase instantaneous current values iu, iv, and iw in a three-phase stationary coordinate system defined in the stator into d-axis and q-axis currents id and iq in the d-q coordinate system of the rotor. Parallelly, the MPU 50 determines, based on the request torque Tr, a d-axis command current idr and a q-axis command current iqr in the d-q coordinate system of the rotor.

Then, the MPU 50 temporarily selects one of the effective voltage vectors V1 to V6, and sets the selected voltage vector Vi (i=1, 2, 3, 4, 5, or 6) as the temporary switching mode of the inverter INV. Thus, the MPU 50 converts the selected voltage vector Vi into a voltage vector (vd, vq) in the d-q coordinate system of the rotor.

Next, the MPU 50 predicts, based on the voltage vector (vd, vq), the d- and q-axis currents id and iq, and an electric angular velocity ω corresponding to the rotational angle θ, and the following predetermined voltage equation [EQ], a d-axis current value id and a q-axis current value iq; the predicted d-axis and q-axis current values ide and iqe should flow through the motor-generator 10 when the inverter INV is driven by the selected voltage vector Vi.

$$\begin{bmatrix} vd \\ vq \end{bmatrix} = \begin{bmatrix} R+pLd & -\omega Lq \\ \omega Ld & R+pLq \end{bmatrix} \begin{bmatrix} id \\ iq \end{bmatrix} + \begin{bmatrix} 0 \\ \omega \phi \end{bmatrix} \qquad [EQ]$$

where R represents an armature resistance, φ represents a magnet flux linkage to armature winding, and p represents differential operator.

That is, the MPU 50 predicts d-axis and q-axis current values ide and iqe for each of the effective voltage vectors V1 to V6, and selects one of effective voltage vectors V1 to V6. The selected one of the effective voltage vectors V1 to V6 allows the corresponding predicted d-axis and q-axis current values ide and iqe to be as close as possible to the d-axis and q-axis command currents idr and iqr.

Thus, the MPU 50 determines the switching mode corresponding to the selected one of the effective voltage vectors V1 to V6.

After determination of the switching mode, the MPU 50 sends, to the transmitter 40, drive signals g¥# based on the determined switching mode for the respective switching elements S¥#. That is, the MPU 50 serves as, for example, an instruction unit configured to periodically output, to the transmitter 40, drive signals g¥# as a target signal.

The drive signals g¥# represent the corresponding switching mode in which the respective switching elements S¥# are ON or OFF. For example, in order to turn on a switching element Sup, a drive signal gup is set to a first voltage signal corresponding to logical 1, and, in order to turn off a switching element Sup, a drive signal gup is set to a second voltage signal corresponding to logical 0.

Figure 2:
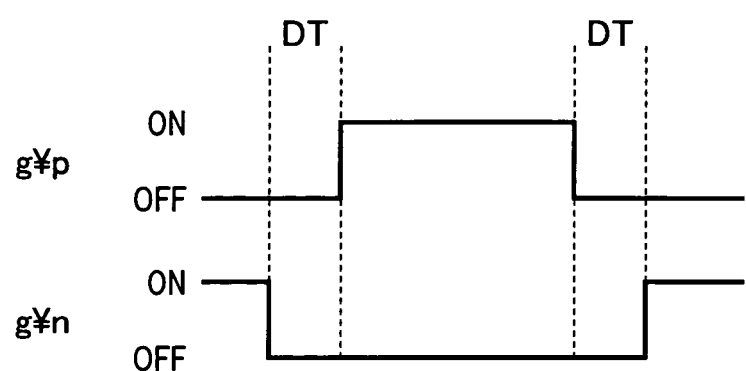
FIG. 2 is a timing chart schematically illustrating drive signals for driving high- and low-side switching elements using a dead time according to the first embodiment.

In this embodiment, for generation of the high-side and low-side drive signals g¥p and en, the MPU 50 introduces a time delay (dead time) DT between each of the high-side drive signals g¥p and a corresponding one of the low-side drive signals g¥n to prevent a short circuit in the DC link (see FIG. 2).

That is, one leg (one phase high- and low-side switching elements) of the inverter INV can be shifted in its state when a current switching mode is shifted to another switching mode. Note that the shift of the state of one leg of the inverter INV means that: one of the high-side switching elements S¥p is switched from ON to OFF or OFF to ON, so that a corresponding one of the low-side switching elements S¥n is switched OFF to ON or ON to OFF.

If one leg (one phase high- and low-side switching elements) of the inverter INV is shifted in its state in response to shift of a current switching mode to another switching mode, the MPU 50 delays the rising edge of one of the high-side drive signal g¥p and the low-side drive signal g¥n of the corresponding leg by the dead time DT relative to OFF timing of the other of the high-side drive signal g¥p and the low-side drive signal g¥n. The length of the delay time DT can be determined based on the shift speed of each of the switching elements S¥# from ON (OFF) to OFF (ON).

The transformer T is comprised of a primary coil W1 and four secondary coils W2u, W2v, W2w magnetically linked to the primary coil W1.

The transmitter 40 is comprised of an encoder 41, a shift register 43, a driver 44, an inverter driver 45, and a full-bridge converter 46.

The encoder 41 is configured to encode, based on digital baseband encoding, the drive signals g¥#, that is, binary logic (0 or 1) signals sent from the MPU 50 into a pulse code signal, and apply a voltage based on the pulse code signal to the primary coil W1 of the transformer T. As a result, pulsed voltage signals are induced in the respective secondary windings W2a, W2u, W2v, and W2w.

The secondary coil W2n is connected to the receiver 30 installed in the drive unit DU provided for the U-phase lower-arm switching element Sun. Each of the secondary coils W2u, W2v, and W2w are connected to the receivers 30 installed in the drive units DU provided for the respective U-, V-, and W-phase upper-arm switching elements Sup, Svp, and Swp.

In the first embodiment, the transmitter 40, the transformer T, and the receivers 30 provide a signal and power transmission system. That is, the signal and power transmission system according to this embodiment aims to transmit signals and power to the drive units DU, more exactly, the drivers 20 for the-motor generator 10.

Figure 3:
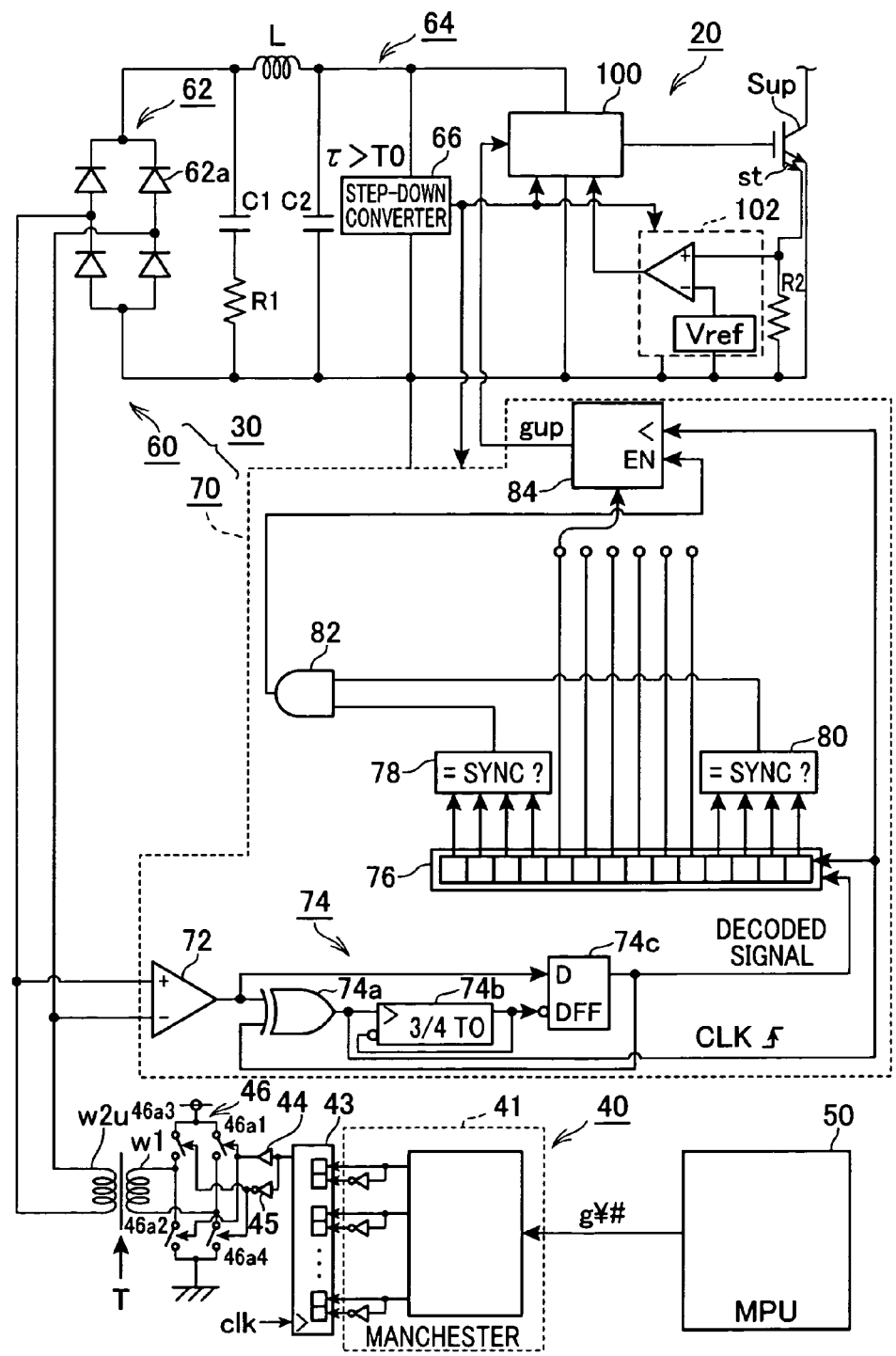
FIG. 3 is a circuit diagram schematically illustrating a signal and power transmission system according to the first embodiment.

Next, an example of the overall structure of the signal and power transmission system will be described hereinafter with reference to FIG. 3. In FIG. 3, for convenience, the signal and power transmission path to the drive unit DU provided for the U-phase upper-arm switching element Sup via the signal and power transmission system is illustrated as a representative of the signal and power transmission paths to all the drive units DU provided for the switching elements S¥#.

Figure 4:
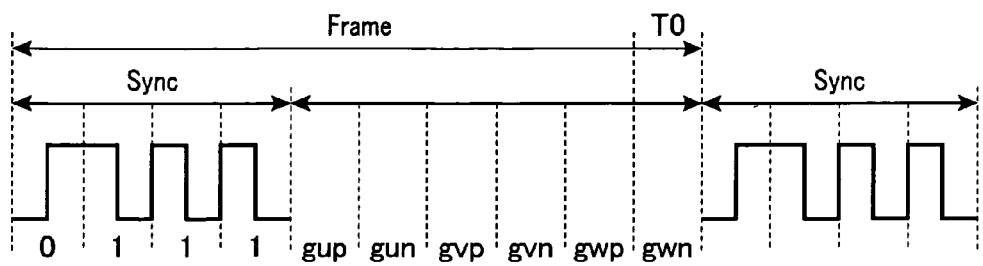
FIG. 4 is a timing chart schematically illustrating a pulse code signal according to the first embodiment.

The drive signals g¥# outputted from the microprocessor unit 50 are encoded based on digital baseband encoding into a pulse code signal. In this embodiment, as the digital baseband encoding, Manchester encoding, as an example of various types of biphase encoding, is used. A pulse code signal, i.e. a Manchester code signal, encoded based on Manchester encoding is illustrated in FIG. 4. Referring to FIG. 4, each bit of the drive signals g¥# of the drive signals g¥# is transmitted in a unit period T0. A 0 (logical 0) is expressed by a low-to-high level transition, and a 1 (logical 1) is expressed by a high-to-low level transition. The level transitions which signify a 0 or a 1 occur at the midpoint of a period T0. As illustrated in FIG. 4, the Manchester code signal contains a sync (synchronous) signal of four bits, and continuous six bits respectively expressing the drive signals gup, gun, gvp, gvn, gwp, and gwn. The sync signal represents the start of an information signal, that is, the drive signals g¥#. Thus, one frame containing the sync signal and the drive signals gup, gun, gvp, gvn, gwp, and gwn is periodically outputted as a Manchester code signal, in other words, the output period of the drive signals gup, gun, gvp, gvn, gwp, and gwn, which is defined as a frame, is set to the length of ten bits. In other words, the period of output of the frames is set to 10·T0.

In this embodiment, 1 (logical 1) corresponds to ON command, and 0 (logical 0) corresponds to OFF command. Thus, in this embodiment, the sync signal is set to "0111". That is, because the upper-arm drive signal g¥p (¥=u, v, or w) and a corresponding lower-arm drive signal g¥n are not simultaneously ON, six-bit data expressing the drive signals g¥# cannot contain three-successive bits of 1, so that data expressing the drive signals g¥# and the sync signal can be distinguished. Note that why the first bit of the sync signal is set to 0 is to reliably distinguish the sync signal from the drive signals g¥#.

In addition, the N times the period of one frame, which corresponds to ten times the period T0, is set to the dead time DT.

Specifically, if one leg (one phase high- and low-side switching elements) of the inverter INV is shifted in its state when a current switching mode is shifted to another switching mode, OFF command, that is logical 0, is set to both the high-side drive signal g¥p and the low-side drive signal g¥n of the corresponding leg during the period of N-times frame. Note that the period of one frame is desirably set to be lower than a lower-limit time during which both high- and low-side switching elements cannot be simultaneously ON when the corresponding leg state is changed.

The pulse code signal encoded by the encoder 41 is inputted to the shift register 43. The shift register 43 is configured to output the pulse code signal to the primary coil W1 in synchronization with a clock signal clk inputted thereto.

Specifically, to the primary coil W1, the full-bridge circuit 46 is connected. The output signal of the shift register 43 is inputted to the driver 44 and the inverter driver 45 that drive bridge-connected switching elements 46a1 to 46a4 of the full-bridge circuit 46. The output of the driver 44 is connected to the control terminals of the switching elements 46a1 and 46a2, and the output of the inverter driver 45 is connected to the control terminals of the switching elements 46a3 and 46a4. That is, from the shift register 43, the bits of the pulse code signal corresponding to the drive signals g¥# are sequentially outputted bit by bit to each of the driver 44 and the inverter driver 45. The shift register 43, the driver 44, the inverter driver 45, and the full-bridge converter 46 serve as a voltage applying unit to the primary coil W1.

Each bit of the pulse code signal is either the set of a high level in the first half period (T0/2) and a low level in the second half period, which corresponds to a logical 1, or the set of a low level in the first half period (T0/2) and a high level in the second half period, which corresponds to a logical 0. In this embodiment, a high level or a low level in the pulse code signal corresponding to one bit of the drive signals gY# will be referred to as a chip code hereinafter.

Thus, if a chip code outputted from the shift register 43 is a high level, the switching elements 46$a$1 and 46$a$2 are on, but the switching elements 46$a$3 and 46$a$4 are off because the output of the inverter driver 45 is a low level. This results in a positive voltage VA across the full-bridge circuit 46 being applied to the primary coil W1.

In contrast, if a chip code outputted from the shift register 43 is a low level, the switching elements 46l and 46$a$2 are off, but the switching elements 46$a$3 and 46$a$4 are on because the output of the inverter driver 45 is a high level. This results in a negative reference voltage VA across the full-bridge circuit 46 being applied to the primary coil W1.

When a voltage signal (a positive or negative reference voltage VA) is applied to the primary coil W1 as an input voltage signal, a voltage signal based on the predetermined turns ratio between the primary coil W1 and the secondary coil W2$u$ is induced across the secondary coil W2$u$. The predetermined turns ratio is the ratio of the number of turns in the primary coil W1 to that of turns in, the secondary coil W2$u$. The receiver 30 connected to the secondary coil W2$u$ is equipped with a power supply circuit 60 and a decode unit 70.

The power supply circuit 60 is comprised of a bridge rectifier 62, a filter circuit 64, and a step-down converter 66. The bridge rectifier 62 is comprised of bridge-connected diodes 62$a$ and operative to full-wave rectify a current flowing therethrough based on a voltage signal induced across the secondary coil W2$u$.

The filter circuit 64 is designed as a second-lag filter, that is, a $\pi$ network filter including a resistor R1, a capacitor C1, a coil L, and a capacitor C2, and is configured to smooth a rectified current outputted from the rectifier 62 to output a DC voltage. The output voltage (DC voltage) from the filter circuit 64 is inputted to the step-down converter 66 and to the driver 20. The step-down converter 66 is operative to step down the output voltage from the filter circuit 64.

The driver 20 is comprised of a drive IC 100 connected to the control terminal (gate) of the switching element Sup, and an overcurrent protection circuit 102 serving as, for example, a monitor unit for monitoring the corresponding switching element Sup.

The drive IC 100 is operative to turn on the switching element Sup according to the drive signal gap outputted from the decode unit 70.

The overcurrent protection circuit 102 is operative to monitor a current flowing through the switching element Sup, and output an instruction to the drive IC 100 to forcibly turn off the switching element Sup when the monitored current level is equal to or higher than a threshold level. For example, each of the switching elements SY# has a sense terminal St, and the overcurrent protection circuit 102 is comprised of a comparator 102$a$. If a voltage across a resistor R2 through which a minor current correlated with a current flowing through the switching element Sup flows via the sense terminal St is equal to or higher than a preset reference voltage Vref, the comparator 102 outputs the instruction to the drive ID 100, and the drive IC 100 forcibly turns off the switching element Sup.

In this embodiment, the step-down converter 66 is operative to step down the output voltage from the filter circuit 64 on the basis of the difference between voltage for driving the switching element Sup and power-supply voltage for the IC 100, the overcurrent protection circuit 102, and the decode unit 70. Thereafter, the step-down converter 64 is operative to output, to each of the elements 100, 102, and 70, the stepped down voltage as the power supply voltage therefor. For example, the step-down converter 66 steps down the output voltage of 20 V from the filter circuit 64 to a voltage of 5 V or thereabout, and each of the elements 100, 102, and 70 operates on the voltage of 5V as its power supply voltage.

The decode unit 70 is comprised of a data slicer 72 and a decoder 74. The data slicer 72 is operative to limit the variation in the voltage signal induced across the secondary coil W2$u$ to be within an operation voltage range of logic circuits of the decoder 74 of the decode unit 70 described hereinafter. An output voltage of the data slicer 72 is inputted to the decoder 74. The decoder 74 is comprised of a XOR circuit 74$a$, a one-shot pulse circuit 74$b$, and a D flip-flop 74$c$.

The XOR circuit 74$a$ is operative to output exclusive OR of the output voltage of the data slicer 72 and an output voltage of the D flip-flop 74$c$. The one-shot pulse circuit 74$b$ is operative to generate a one-shot pulse signal with a preset pulse width in synchronization with the rising edge of an output voltage of the XOR circuit 74$a$ if it does not generate a one-shot pulse signal at the rising edge of the output voltage of the XOR circuit 74$a$. In this embodiment, the pulse width of a one-shot pulse signal is set to 3·T0/4. The setting of the pulse width of a one-shot pulse signal is an example for easily generating a clock signal CLK. In this embodiment, the clock signal CLK rises each time the level transition occurs in the output voltage of the data slicer 72. That is, the clock signal CLK is synchronized with each bit of the drive signals gY#.

The D flip-flop 74$c$ is operative to output, as an input signal to its D input terminal, an output signal from the data slicer 72 at timing of the falling edge of a one-shot pulse signal outputted from the one-shot pulse circuit 74$b$. In other words, the D flip-flop 74$c$ is operative to update an output signal of its output terminal at timing of the falling edge of a one-shot pulse signal outputted from the one-shot pulse circuit 74$b$ to an output signal from the data slicer 72 at the timing.

Figure 5:
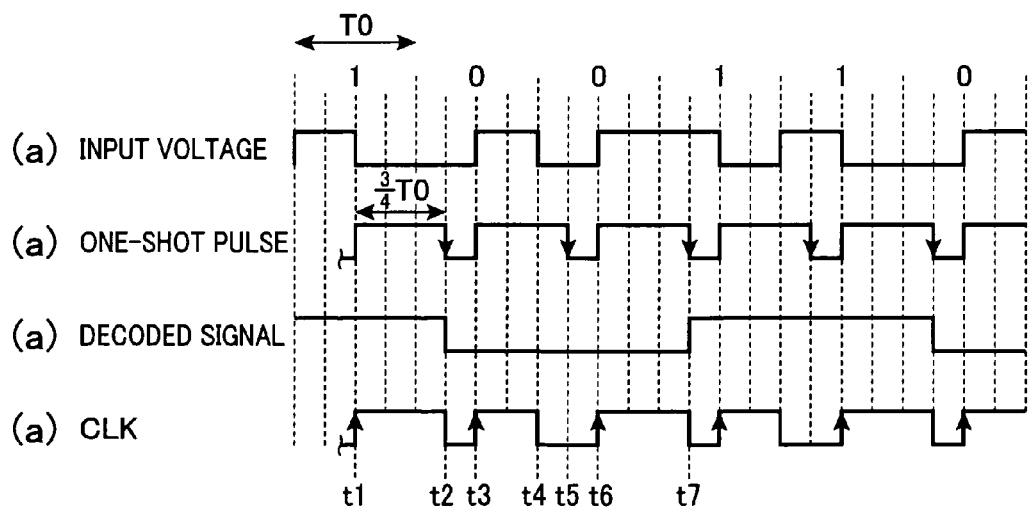
FIG. 5 is a timing chart schematically illustrating operations of a decoder illustrated in FIG. 3.

Operations of the decoder 74 will be described in detail with reference to FIG. 5. In FIG. 5, (a) represents how the input voltage to the decoder 74, which corresponds to the pulse code signal (Manchester code signal) encoded by the encoder 41, is changed. (b) represents how the output of the one-shot pulse circuit 74$b$ is changed, and (c) represents how the output of the D flip-flop 74$c$, which corresponds to decoded signal, is changed. In addition, (d) represents how the clock signal CLK as the output of the XOR circuit 74$a$ generated from the input signal to the decoder 74 is changed.

In FIG. 5, at time t1, the input voltage to the decoder 74 shifts from the high level to the low level with the output of the D flip-flop 74$c$ being high, the output of the XOR circuit 74$a$ rises, so that, at the rising edge, a one-shot pulse is generated by the one-shot pulse circuit 74$b$ at the time U. During output of the one-shot pulse from the time t1, the output of the D flip-flop 74$c$ is kept at the high level. After lapse of 3·T0/4 from the time t1, the output of the XOR circuit 74$a$ falls at time t2, and, at the falling edge t2, the output of the D flip-flop 74$c$ is updated to the input of the decoder 74, that is, the output of the data slicer 72 at the time t2. Because the input of the decoder 74 is the low level at the time t2, the output of the D flip-flop 74$c$ shifts from the high level to the low level.

After lapse of T0/4 from the time t2, the input voltage to the decoder 74 shifts from the low level to the high level with the output of the D flip-flop 74$c$ being low at time t3. Thus, the output of the XOR circuit 74$a$ rises at the time t3, so that, at the rising edge, a one-shot pulse is generated by the one-shot pulse circuit 74b at the time t3. During output of the one-shot pulse from the time t3, the input voltage to the decoder 74 shifts from the high level to the low level with the output of the D flip-flop 74c being low at time t4, so that the output of the XOR circuit 74a falls at the time t4. Thereafter, after lapse of 3·T0/4 from the time t3, the output of the XOR circuit 74a is kept low at time t5 because both inputs to the XOR circuit 74a are low.

After lapse of T0/4 from the time t5, the input voltage to the decoder 74 shifts from the low level to the high level with the output of the D flip-flop 74c being low at time t6. Thus, the output of the XOR circuit 74a rises at the time t6, so that, at the rising edge, a one-shot pulse is generated by the one-shot pulse circuit 74b at the time t6. During output of the one-shot pulse from the time t6, the output of the D flip-flop 74c is kept at the low level. After lapse of 3·T0/4 from the time t6, the output of the XOR circuit 74a falls at time t7, and, at the falling edge t7, the output of the D flip-flop 74c is updated to the input of the decoder 74, that is, the output of the data slicer 72 at the time t7. Because the input of the decoder 74 is the high level at time t7, the output of the D flip-flop 74c shifts from the low level to the high level.

Thus, the output of the D flip-flop 74c is changed to be identical to the drive signals gȲ# inputted to the encoder 41. That is, the pulse code signal (Manchester code signal) is decoded as a decoded signal corresponding to the drive signals gȲ#.

The decode unit 70 is also comprised of a shift register 76, sync signal determiners 78 and 80, an AND circuit 82, and a drive-signal output circuit 84.

The decoded signal as the output signal from the D flip-flop 74c is inputted to the shift register 76. The shift register 76 is operative to sequentially store a value of the decoded signal as one bit data at each rising edge of the output signal of the XOR circuit 74a, in other words, each rising edge of the clock signal CLK. In this embodiment, the storage capacity of the shift register 76 is set to 14 bits. This storage capacity is determined to allow storage of: data of present one frame of the drive signals gȲ# outputted from the microprocessor unit 50; and data of the sync signal of the next frame to be outputted therefrom.

The sync signal determiner 78 is operative to determine whether the first four bits of the shift register 76 are a sync signal, and the sync signal determiner 80 is operative to determine whether the last four bits of the shift register 76 are a sync signal. The output of each of the sync signal determiners 78 and 80 are inputted to respective input terminals of the AND circuit 82.

The AND circuit 82 is operative to output an enabling signal to the drive-signal output circuit 84 when both the sync signal determiners 78 and 80 determines that the first four bits and the last four bits of the shift register 76 are both sync signals. The drive-signal output circuit 84 is operative to output, to the drive IC 100, a signal of the fifth bit from the first bit of the shift register 76 as a decoded drive signal gup. For example, if a signal of the fifth bit from the first bit of the shift register 76 is the first voltage signal corresponding logical 1, the drive IC 100 turns on the switching element Sup, and if a signal of the fifth bit from the first bit of the shift register 76 is the second voltage signal corresponding logical 0, the drive IC 100 turns off the switching element Sup.

The signal and power transmission paths to the remaining drive units DU provided for the remaining switching elements SȲ# are substantially the same as that to the drive unit DU for the switching element Sup except for the following points.

Specifically, the drive-signal output circuit 84 in the drive unit DU for the switching element Svp is operative to output, to the drive IC 100, a signal of the seventh bit from the first bit of the shift register 76 as a decoded drive signal gvp. The drive-signal output circuit 84 in the drive unit DU for the switching element Swp is operative to output, to the drive IC 100, a signal of the ninth bit from the first bit of the shift register 76 as a decoded drive signal gwp. The drive-signal output circuit 84 in the drive unit DU for the switching element Sun is operative to output, to the drive IC 100, a signal of the sixth bit from the first bit of the shift register 76 as a decoded drive signal gun, and to output, to the respective driver ICs 100, the respective eighth and tenth bits from the first bit of the shift register 76 as respective decoded drive signals gvn and gwn.

Note that the time constant $\tau$ of the filter circuit 64 is set to be longer than the maximum period during which a voltage signal induced across the secondary coil W2u, is unchanged. In this embodiment, the maximum period is the unit period T0. This setting of the time constant $\tau$ of the filter circuit 64 results in a voltage signal, inputted to the decoder 74, reliably having a square wave. The time constant $\tau$ of the filter circuit 64 represents the time it takes the variation in the smoothed voltage to the variation in the step input voltage to a preset percentage, such as about 37%, of the variation in the step input voltage. The time constant $\tau$ serves as a parameter for quantifying response of the filter circuit 64, and therefore, the shorter the time constant $\tau$ is, the higher the response of the filter circuit 64 is.

The time constant $\tau$ of the filter circuit 64 is set to be longer than the maximum period during which a voltage signal induced across the secondary coil W2u becomes constant. This means that the time it takes the variation of the voltage signal inputted to the filter circuit 64 to be below the preset percentage is longer than the maximum period.

Figure 8:
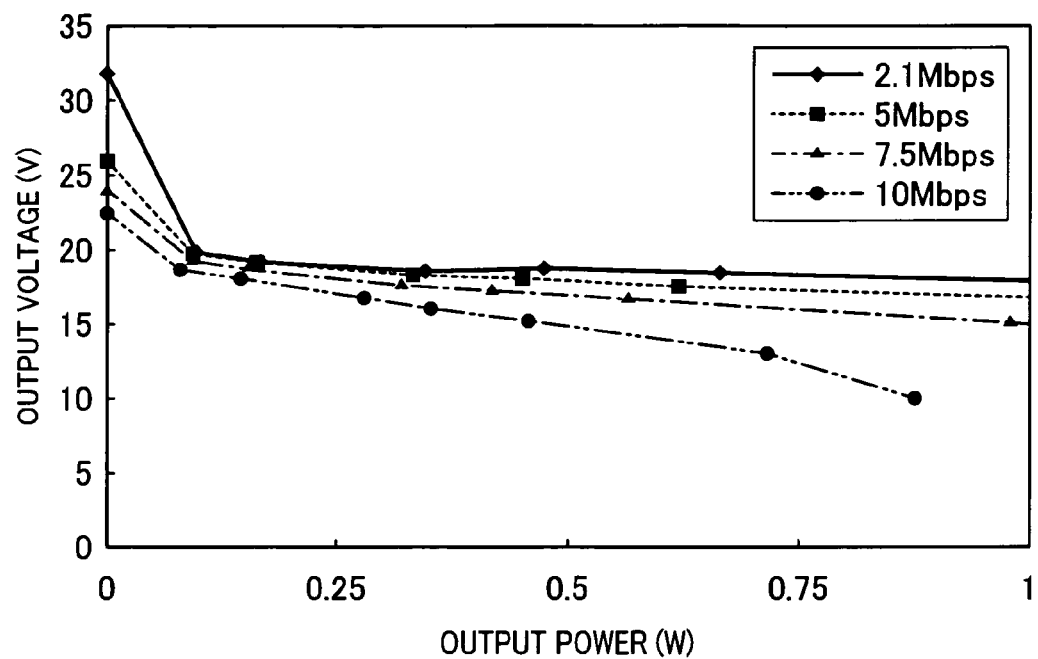
FIG. 8 is a timing chart schematically illustrating results of performance evaluation of the signal and power transmission system according to the first embodiment.

FIGS. 6 to 8 show results of performance evaluation of the signal and power transmission system according to this embodiment.

FIG. 6 schematically illustrates how a drive signal gwp is transmitted when the signal transmission rate of the signal and power transmission system is set to 2.1 Mbps. In FIG. 6, (a) shows how the drive signal gwp outputted from the MPU 50 is changed, and (b) shows how a voltage corresponding to the drive signal gup applied to the primary coil W1 is changed. In FIG. 6, (c) shows how a voltage signal induced across the secondary coil W2 corresponding to the voltage applied to the primary coil W1 is changed, and (d) shows how a decoded drive signal gwp based on the voltage signal induced across the secondary coil W2w and outputted to the drive IC 100 is changed. The drive signal gwp illustrated in (a) of FIG. 6 is an expansion of the drive signal gwp illustrated in (c) of FIG. 6, and the decoded drive signal gwp is expressed in the same scale as the drive signal gwp illustrated in (a) of FIG. 6. Particularly, in FIG. 6, (e), (f), (g), and (h) are enlarged views of the respective (a), (b), (c), and (d) within the area A.

FIG. 7 schematically illustrates results of the decoding process of the decoder 74 when the signal transmission rate of the signal and power transmission system is set to 2.1 Mbps. In FIG. 7, (a) shows how a voltage signal induced across the secondary coil W2 is changed, (b) shows how a clock signal CLK based on the voltage signal induced across the secondary coil W2 is changed, and (c) shows how a decoded signal corresponding to an output signal of the D flip-flop 74c is changed. Particularly, in FIG. 7, (d), (e), and (f) are enlarged views of the respective (a), (b), and (c) within the area B.

FIGS. 6 and 7 demonstrate that the signal and power transmission system according to this embodiment makes it possible to successfully carry out transmission of drive signals gΥ# (particularly, see a pair of (a) and (d) and a pair of (e) and (f) of FIG. 6, and a pair of (e) and (f) of FIG. 7).

Note that, when the signal transmission rate of the signal and power transmission system is set to be equal to or higher than 10 Mbps, successful transmission of drive signals gΥ# has been demonstrated.

FIG. 8 schematically illustrates the relationship between the output voltage signal induced across the secondary coil W2 and the output power to each drive unit DU when the signal transmission rate of the signal and power transmission system is set to each of 2.1 Mbps, 5 Mbps, 7.5 Mbps, and 10 Mbps. As illustrated in FIG. 8, successful power transmission has been demonstrated even if the signal transmission rate of the signal and power transmission system is set to 10 Mbps.

As described above, the signal and power transmission system according to this embodiment is configured such that the decode unit 70 and the power supply circuit 60 are connected to each of the secondary coils W2n, W2u, W2v, and W2w. This configuration enables both transmission of drive signals gΥ# for the respective switching elements SΥ# and transmission of operating power to the corresponding drivers 20. In addition, this configuration facilitates the difference between the operating voltage for the elements in each of the drive units DU, such as 5V, and the input voltage to the power supply circuit 60, such as 20 V.

The signal and power transmission system according to this embodiment is configured such that a target signal to be transmitted is comprised of drive signals gΥ# and a sync signal. Each time drive signals gΥ# are updated, this configuration facilitates identification of the drive signals gΥ# being updated.

The signal and power transmission system according to this embodiment is configured to encode a target signal to be transmitted using Manchester encoding. This configuration enables the average of the voltages applied to the primary coil W1 in each frame, that is, in each bit to be zero. In other words, this configuration enables the average of a variation in interlinkage flux to the primary coil W1 and the secondary coil W2 over each frame to be zero, the interlinkage flux being based on the voltages applied to the primary coil.

This prevents interlinkage flux to the primary coil W1 from being excessively large.

The signal and power transmission system according to this embodiment is configured to generate, based on a voltage signal induced in each of the secondary coils W2n, W2u, W2v, and W2w, a clock signal CLK that rises each time the level transition occurs in the input voltage to the decoder 74. This configuration enables the decoder 74 to easily carry out decoding of drive signals gΥ# from the input voltage.

The signal and power transmission system according to this embodiment is configured such that the time constant τ of the filter circuit 64 is set to be longer than the maximum period during which a voltage signal induced across the secondary coil W2u is unchanged. This configuration reliably ensures the decoding process of each of the decoding units 70 independently of the smoothing process of the filter circuit 64.

The signal and power transmission system according to this embodiment is comprised of the plurality of secondary coils W2n, W2u, W2v, and W2w as secondary coil of the transformer T. This enables the single transformer T to transmit signals and power to the drive units DU for the respective switching elements SΥ#; these drive units DU can operate on different operating potentials.

In the signal and power transmission system according to this embodiment, the sync signal includes the same three logical values corresponding to ON command. This enables the sync signal to be as short as possible while it is capable of identifying drive signals gΥ#.

In the signal and power transmission system according to this embodiment, a pair of drive signals gΥp and gΥn represents any one of the following instruction patterns:

(i) to turn on a high-side switching element SΥp and turn off a corresponding low-side switching element SΥn; (ii) to turn off a high-side switching element SΥp and turn on a corresponding low-side switching element SΥn, and (iii) to turn off a high-side switching element SΥp and a corresponding low-side switching element SΥn.

This makes it possible for the signal and power transmission system to output all the switching patterns for the switching elements SΥ# without the switching pattern in which a switching element SΥp and a corresponding switching element SΥn are both on.

The signal and power transmission system according to this embodiment is configured such that, if one leg of the inverter INV is shifted in its state in response to shift of a current switching mode to another switching mode, the drive signal gΥp and the drive signal gΥn for the one leg are set to be OFF commands. This configuration facilitates introduction of the dead time DT between each of the high-side drive signals gΥp and a corresponding one of the low-side drive signals gΥn to prevent a short circuit in the DC link using drive signals gΥ# without providing, in each drive unit DU, any means for generating the dead time DT.

In the signal and power transmission system according to this embodiment, the step-down converter 66 is used as a power supply for the overcurrent protection circuit 102. This reliably ensures the power supply for the overcurrent protection circuit 102.

In the signal and power transmission system according to this embodiment, the primary coil W1 and each of the secondary coils W2n, W2u, W2v, and W2w are insulated from each other. This configuration effectively accommodates the difference between the operating potential of the elements connected to the primary coil W1 and that of the elements connected to each of the secondary coils W2n, W2u, W2v, and W2w.

The signal and power transmission system according to this embodiment is provided with the data slicer 72. The data slicer 72 limits the variation in a voltage signal induced across each of the secondary coils W2n, W2u, W2v, and W2w to be within the operation voltage range of logic circuits of the decoder 74 of the decode unit 70, and inputs it to the decoder 74. This establishes the peak-to-peak of the voltage signal induced in each of the secondary coil W2n, W2u, W2v, and W2w to meet the requirement for the output voltage of the rectifier 62 of, for example, 20 V or thereabout while setting the input voltage to the decoder 74 to an appropriate level of, for example, 5 V.

The signal and power transmission system according to this embodiment is configured to use the MPC for controlling a controlled variable of the motor generator 10. With this configuration, setting the period 10·T0 of output of the frame to be lower than the period of execution of the MPC prevents delay in the response of the MPC due to the transmission of signals by the signal and power transmission system.

Second Embodiment

A signal and power transmission system according to the second embodiment of the present disclosure will be described with reference to FIG. 9.

The structure and/or functions of the signal and power transmission system according to the second embodiment are mainly identical to those of the signal and power transmission system according to the first embodiment except for the following points. So, the different points will be mainly described hereinafter.

The signal and power transmission system according to this embodiment is configured to disable updating of drive signals gȲ# if a decoded signal stored in the shift register 76 includes a pair of bits representing that the corresponding pair of high-side and low-side drive signals gȲp and gȲn of one same leg are ON commands. If such a state is continued for given cycles of transmission of drive signals gȲ#, the signal and power transmission system according to this embodiment is configured to forcibly turn off all the switching elements SȲ#.

Figure 9:
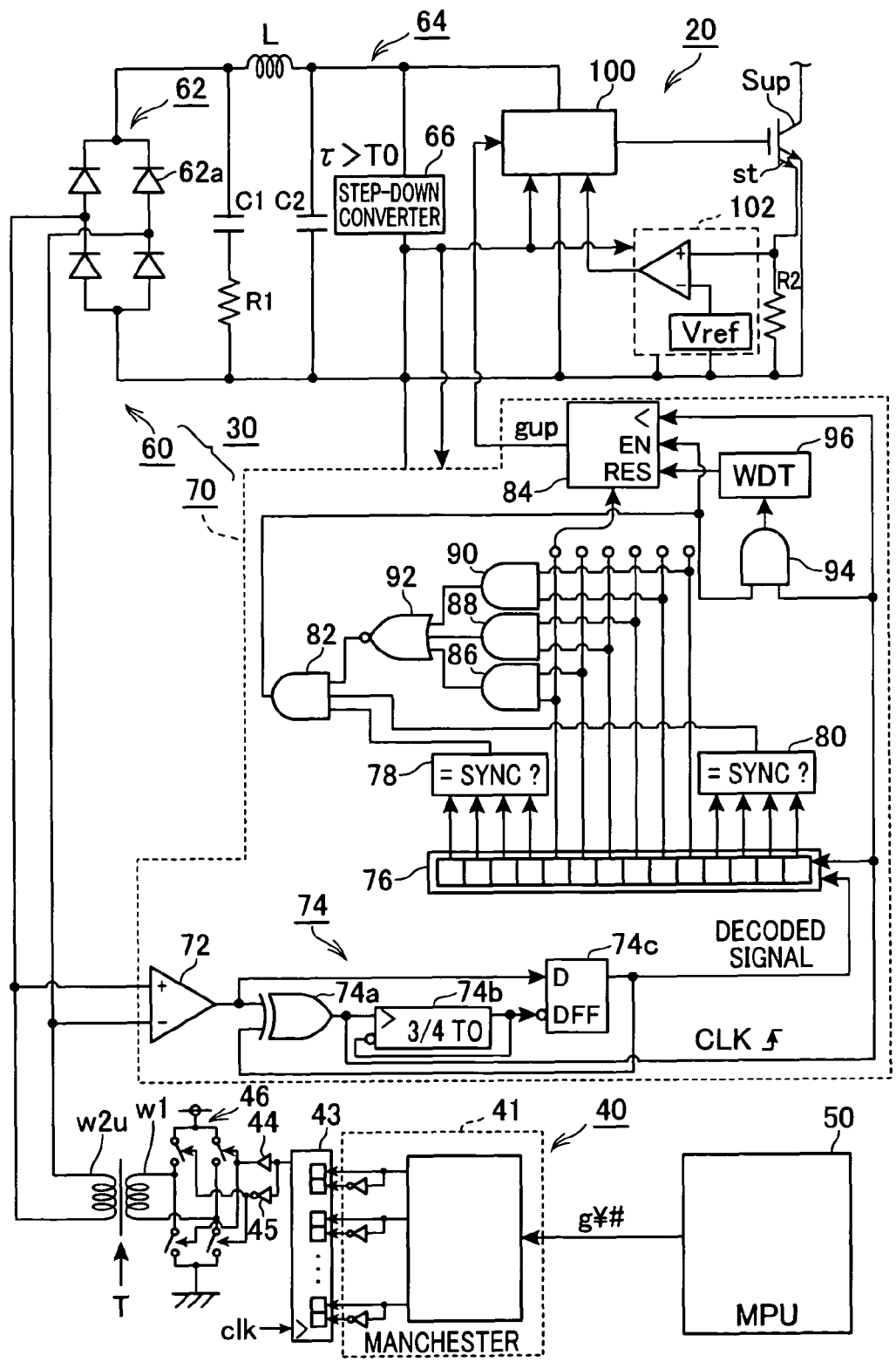
FIG. 9 is a circuit diagram schematically illustrating a signal and power transmission system according to a second embodiment of the present disclosure.

Specifically, as illustrated in FIG. 9, a decode unit 70A is further comprised of AND circuits 86, 88, and 90, a NOR circuit 92, an AND circuit 94, and a watchdog timer 96. The AND circuits 86, 88, and 89 serve as, for example, a fault detector configured to detect a fault in drive signals gȲ#.

The AND circuit 86 is operative to determine whether each of a signal of the fifth bit from the first bit of the shift register 76 and a signal of the sixth bit from the first bit of the shift register 76 represents ON command (logical 1). Similarly, the AND circuit 88 is operative to determine whether each of a signal of the seventh bit from the first bit of the shift register 76 and a signal of the eighth, bit from the first bit of the shift register 76 represents ON command (logical 1). In addition, the AND circuit 90 is operative to determine whether each of a signal of the ninth bit from the first bit of the shift register 76 and a signal of the tenth bit from the first bit of the shift register 76 represents ON command (logical 1).

That is, each of the AND circuits 86, 88, and 90 is operative to output, to the NOR circuit 92, logical 1 if both the corresponding signals are ON commands, and otherwise logical 0. The NOR circuit 92 is operative to determine, based on the outputs of the AND circuits 86, 88, and 90, whether the pair of high-side drive signal gȲp and low-side drive signal gȲn of at least one leg are both ON commands. The NOR circuit 92 is also operative to output, to the AND circuit 82, logical 0 if the pair of high-side drive signal gȲp and low-side drive signal gȲn of at least one leg are both ON commands, and otherwise output logical 1.

At that time, the AND circuit 82 according to this embodiment is operative to output the enabling signal to the drive-signal output circuit 84 when: both the sync signal determiners 78 and 80 determines that the first four bits and the last four bits of the shift register 76 are respectively sync signals; and logical 1 is inputted from the NOR circuit 92.

The AND circuit 94 is operative to generate a logical AND signal indicative of logical AND between the enabling signal outputted from the AND circuit 82 and the clock signal CLK, and input the logical AND signal to the watchdog timer 96.

The watchdog timer 96 serves as, for example, a fault addressing unit. Specifically, the watchdog timer 96 is adapted to reset the drive-signal output circuit 84 by outputting, to a reset terminal of the circuit 84, a reset signal if the logical AND signal has not been sent from the AND circuit 94 for a preset timeout value. In other words, the watchdog timer 96 is operative to reset the drive-signal output circuit 84 if at least one of the enabling signal and the clock signal CLK has not been inputted to the AND circuit 94 for the preset timeout value. In this embodiment, the timeout value is set to the time equivalent to the length of time taken to transmit three frames, and can be determined by an analog circuit, such as a CR circuit installed in the watchdog timer 96.

Specifically, if at least one of the enabling signal and the clock signal CLK has not been inputted to the AND circuit 94 for the preset timeout value, the watchdog timer 96 resets the drive-signal output circuit 84, thus forcibly turning off the switching element Sup. Each of the remaining receivers 30 for the U-phase lower-arm switching element Sun and V- and W-phase upper-arm switching elements Svp and Swp is also provided with the decoder unit 70A. Therefore, if at least one of the enabling signal and the clock signal CLK has not been inputted to the AND circuit 94 for the preset timeout value for each of the switching elements Sun, Svp, and Swp, the watchdog timer 96 resets the drive-signal output circuit 84, thus forcibly turning off a corresponding one of the switching elements SȲn, Svp and Swp. Thus, it is possible to forcibly turn off all the switching elements SȲ#.

Third Embodiment

A signal and power transmission system according to the third embodiment of the present disclosure will be described with reference to FIGS. 10 and 11.

The structure and/or functions of the signal and power transmission system according to the third embodiment are mainly identical to those of the signal and power transmission system according to the first embodiment except for the following points. So, the different points will be mainly described hereinafter.

Figure 10:
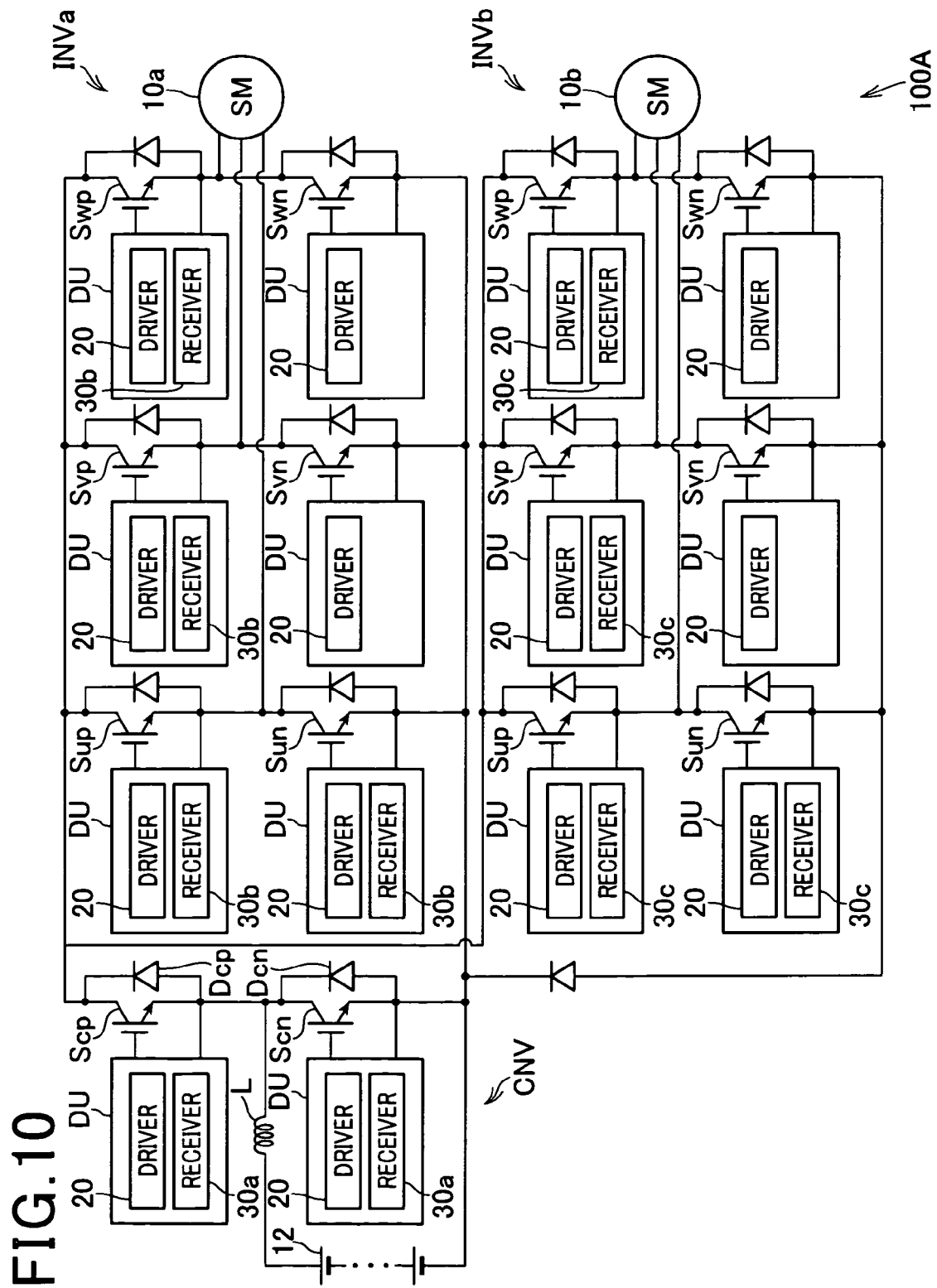
FIG. 10 is a view schematically illustrating an overall configuration of a control system for a motor-generator according to a third embodiment of the present disclosure.

FIG. 10 schematically illustrates a parallel-series hybrid vehicle in which a first motor-generator 10a and a second motor-generator 10b are installed. Each of the first and second motor-generators 10a and 10b has the same structure as the motor-generator 10. In FIG. 10, there is also illustrated a control system 100A. The control system 100A is equipped with a pair of inverters INVa and INVb, and a converter CNV. The motor-generators 10a and 10b are connected to the converter via the respective inverters INVa and INVb. Each of the inverters INVa and INVb has the same structure as the inverter INV.

The converter CNV includes a reactor L1, a pair of series-connected switching elements Scp and Scn, and a pair of flywheel diodes Dcp and Dcn. One end of the reactor L1 is connected to both the positive terminal of the high-voltage battery 12 and the connection point between the switching elements Scp and Scn. The flywheel diodes Dcp and Dcn are connected in antiparallel to the corresponding switching elements Scp and Scn, respectively.

In this embodiment, one end of the series-connected switching elements SȲp and SȲn of each of the three pairs of each of the inverters INVa and INVb, such as the drain of the corresponding high-side switching element, is connected to one end of the series-connected switching elements Scp and Scn of the converter CNV. The other end of the series-connected switching elements SȲp and SȲn of each of the three pairs of each of the inverters INVa and INVb, such as the source of the corresponding high-side switching element, is connected to the other end of the series-connected switching elements Scp and Scn of the converter CNV.

In this embodiment, the drive unit DU is provided for each of the switching elements Scp and Scn. The drive unit DU for each of the switching elements Scp and Scn is connected to the gate, i.e. on/off control terminal, of a corresponding one of the switching elements Scp and Scn.

Each of the drive units DU provided for the respective switching elements Scp and Scn is equipped with a driver 20 and a receiver 30*a* that receives an on/off drive instruction for turning on or off a corresponding one of the switching elements Scp and Scn.

Each of the drive units DU provided for the respective upper-arm switching elements S¥p and for the lower-arm U-phase switching element Sun of the inverter INVa is equipped with a receiver 30*b* that receives an on/off drive instruction for turning on or off a corresponding one of the upper-arm switching elements S¥p and the switching element Sun. Similarly, each of the drive units DU provided for the respective upper-arm switching elements S¥p and for the lower-arm U-phase switching element Sun of the inverter INVb is equipped with a receiver 30*c* that receives an on/off drive instruction for turning on or off a corresponding one of the upper-arm switching elements S¥p and the switching element Sun.

The receiver 30*a* has the same structure as the receiver 30 illustrated in FIG. 3. Each of the receivers 30*b* and 30*c* basically has the same structure as the receiver 30 illustrated in FIG. 3 except for the following point.

Figure 11:
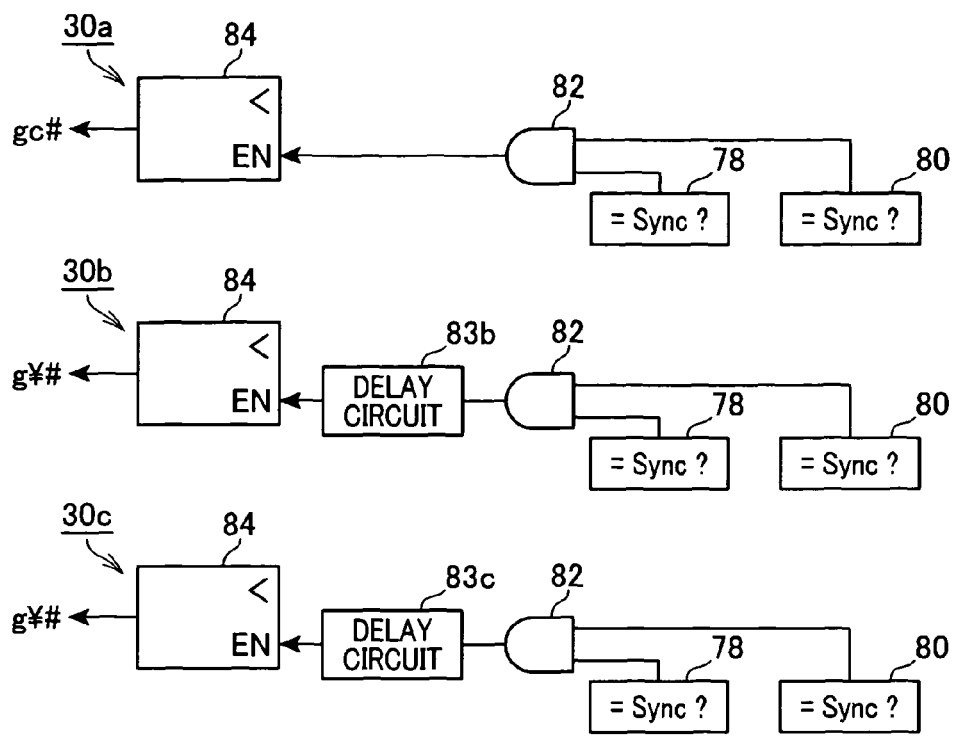
FIG. 11 is a view schematically illustrating a part of a signal and power transmission system according to the third embodiment.

Specifically, referring to FIG. 11, the receiver 30*a* is configured such that the enabling signal outputted from the AND circuit 82 is directly inputted to the drive-signal output circuit 84 like the receiver 30.

In contrast, the receivers 30*b* and 30*c* are comprised of delay circuits 83*b* and 83*c*, respectively. The delay circuit 83*b* is operative to delay the arrival of the enabling signal outputted from the AND circuit 82 to the drive-signal output circuit 84 by a first delay time. Similarly, the delay circuit 83*c* is operative to delay the arrival of the enabling signal outputted from the AND circuit 82 to the drive-signal output circuit 84 by a second delay time. The first delay time and the second delay time are set to be different from each other.

Figure 12:
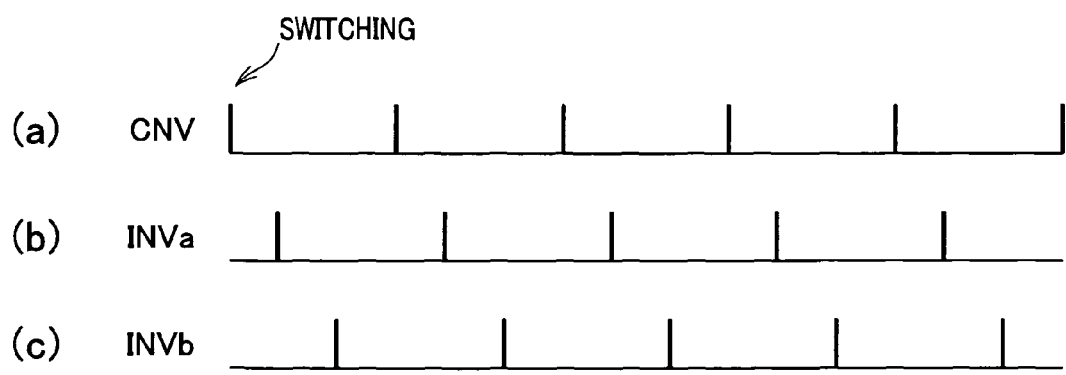
FIG. 12 is a timing chart indicative of shiftable timings of the on/off states of respective converter and inverters illustrated in FIG. 10.

This configuration enables shiftable timings of the on/off states of the respective converter CNV and inverters INVa and INVb to be different from each other (see FIG. 12). Note that a shiftable timing of the on/off state of the converter CNV, the inverter INVa or the inverter INVb means the update timing of present drive signals g¥# to the next drive signals g¥#. Therefore, a shiftable timing of the on/off state of the converter CNV, the inverter INVa or the inverter INVb does not always mean a timing at which the on/off state of the converter CNV, the inverter INVa or the inverter INVb is actually shifted.

The mutually different shiftable timings of the on/off states of the respective converter CNV and inverters INVa and INVb reduce the likelihood of the occurrence of surges.

Fourth Embodiment

A signal and power transmission system according to the fourth embodiment of the present disclosure will be described with reference to FIG. 13.

The structure and/or functions of the signal and power transmission system according to the fourth embodiment are mainly identical to those of the signal and power transmission system according to the third embodiment except for the following points. So, the different points will be mainly described hereinafter.

In this embodiment, each of the inverters 30*a*, 30*b*, and 30*c* has the same structure.

Figure 13:
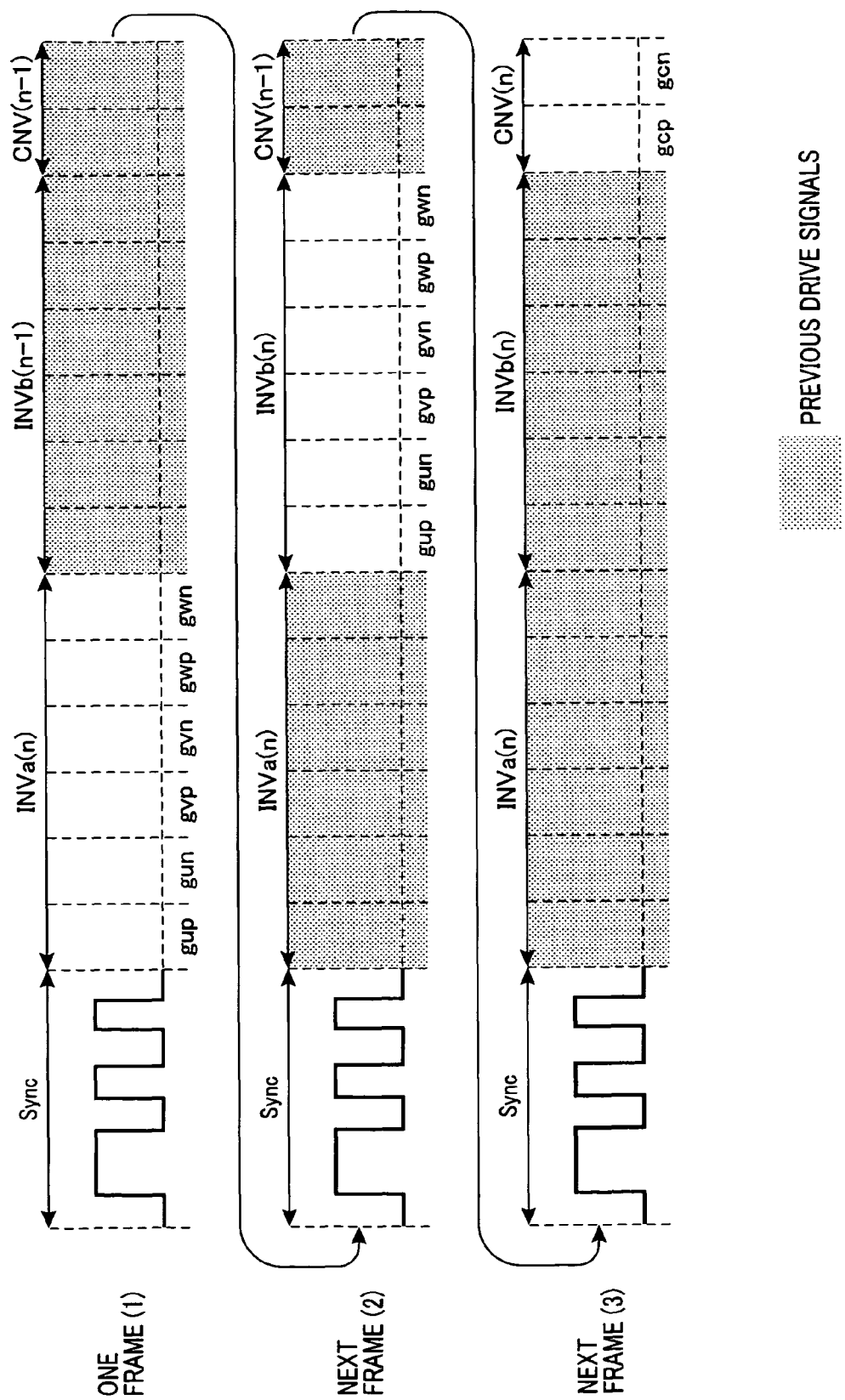
FIG. 13 is a timing chart schematically illustrating how frames are outputted from an encoder to a shift register of the signal and power transmission system according to the third embodiment.

FIG. 13 schematically illustrates how frames are outputted from the encoder 41 to the shift register 43.

Referring to FIG. 13, in each of the third and fourth embodiments, one frame containing the sync signal, drive signals g¥# or the inverter INVa, drive signals g¥# for the inverter INVb, and drive signals gcp and gcn for the converter CNV is periodically outputted as a Manchester code signal, from the encoder 43 to the shift register 43. That is, one frame to be outputted from the encoder 41 to the shift register 43 consists of 16 bits.

In the fourth embodiment, for the inverter INVa, the set of drive signals g¥# is updated to the next set of drive signals g¥# once every transmission of successive three frames. Similarly, for the inverter INVb, the set of drive signals g¥# is updated to the next set of drive signals g¥# once every transmission of successive three frames. In addition, for the converter CNV, the set of drive signals gcp and gcn is updated to the next set of driven signals gcp and gcn once every transmission of successive three frames.

In addition, in the fourth embodiment, for each frame, the set of drive signals for any one of the inverter INVa, the inverter INVb, and the converter CNV is only updated to the set of drive signals therefor.

For example, in FIG. 13, for output of one frame (1) to the shift register 43, the encoder 41 only updates the set (n-1) of drive signals g¥# for the inverter INVa to the next set (n) of drive signals g¥# for the inverter INVa. The set (n) represents the n-th updated set of drive signals. In other words, for output of one frame (I) to the shift register 43, the set (n-1) of drive signals g¥# for the inverter INVb and the set (n-1) of the drive signals gcp and gcn for the converter CNV are kept as they are.

For output of the next frame (2) to the shift register 43, the encoder 41 only updates the set (n-1) of drive signals g¥# for the inverter INVb to the next set (n) of drive signals g¥# for the inverter INVb. In other words, for output of the next frame (2) to the shift register 43, the set (n) of drive signals g¥# for the inverter INVa and the set (n-1) of the drive signals gcp and gcn for the converter CNV are kept as they are.

For output of the next frame (3) to the shift register 43, the encoder 41 only updates the set (n-1) of drive signals gcp and gcn for the converter CNV to the next set (n) of drive signals up and gcn for the converter CNV. In other words, for output of the next frame (3) to the shift register 43, the set (n) of drive signals g¥# for the inverter INVa and the set (n) of the drive signals g¥# for the inverter INVb are kept as they are.

This configuration also enables shiftable timings of the on/off states of the respective converter CNV and inverters INVa and INVb to be different from each other.

Fifth Embodiment

A signal and power transmission system according to the fifth embodiment of the present disclosure will be described with reference to FIG. 14.

The structure and/or functions of the signal and power transmission system according to the fifth embodiment are mainly identical to those of the signal and power transmission system according to the third embodiment except for the following points. So, the different points will be mainly described hereinafter.

In this embodiment, each of the inverters 30a, 30b, and 30c has the same structure.

Figure 14:
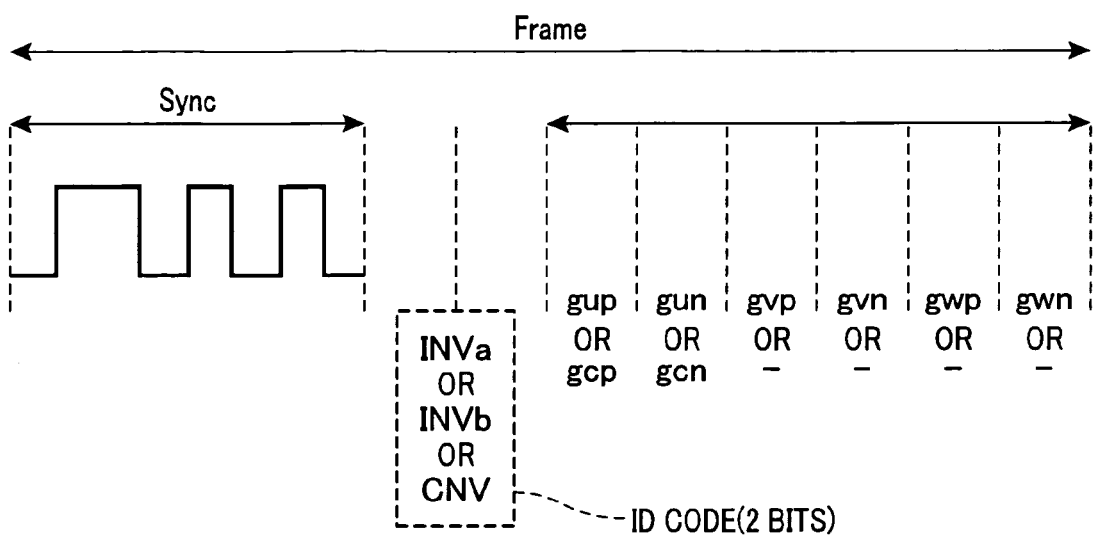
FIG. 14 is a timing chart schematically illustrating how frames are outputted from the encoder to the shift register of the signal and power transmission system according to a fifth embodiment of the present disclosure.

FIG. 14 schematically illustrates how frames are outputted from the encoder 41 to the shift register 43.

Referring to FIG. 14, one frame containing the sync signal, an ID code of two bits, and any one of: the set of drive signals gȲ# for the inverter INVa, the set of drive signals gȲ# for the inverter INVb, and the set of drive signals gcp and gcn for the converter CNV is periodically outputted as a Manchester code signal from the encoder 43 to the shift register 43. The ID coded identifies which of the set of drive signals gȲ# for the inverter INVa, the set of drive signals gȲ# for the inverter INVb, and the set of drive signals gcp and gcn for the converter CNV is contained in this frame. Each of the set of drive signals gȲ# for the inverter INVa, the set of drive signals gȲ# for the inverter INVb, and the set of drive signals gcp and gcn for the converter CNV is updated to the next one once every transmission of successive three frames.

This configuration further enables shiftable timings of the on/off states of the respective converter CNV and inverters INVa and INVb to be different from each other.

Sixth Embodiment

A signal and power transmission system according to the sixth embodiment of the present disclosure will be described with reference to FIG. 15.

The structure and/or functions of the signal and power transmission system according to the sixth embodiment are mainly identical to those of the signal and power transmission system according to the first embodiment except for the following points. So, the different points will be mainly described hereinafter.

Figure 15:
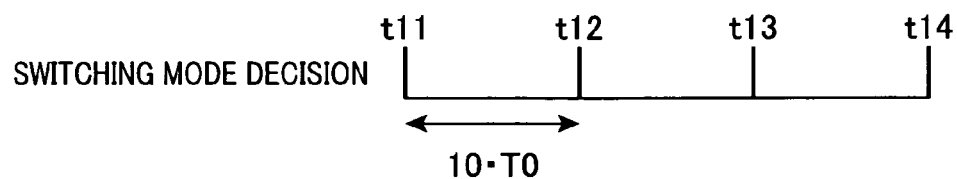
FIG. 15 is a timing chart schematically illustrating updatable timings of a switching mode of the inverter according to a sixth embodiment of the present disclosure.

FIG. 15 schematically illustrates updatable timings t11, t12, t13, and t14 of the switching mode of the inverter INV. Note that an updatable timing of the switching mode of the inverter INV means a timing at which the present switching mode of the inverter INV can be updated to another switching mode thereof, and does not always mean a timing at which the present switching mode of the inverter INV is actually updated to another switching mode thereof.

Referring to FIG. 15, each interval between the temporally adjacent updatable shift timings t11, t12, t13, and t14 are set to the period of one frame, that is, 10·T0 because one frame consists of 10 bits. This setting aims to reduce variations in delays between the timings of determining the switching modes of the inverter IV and the actual update timings of the inverter IV to the determined switching modes.

Specifically, the model predictive control is designed to determine an actual switching mode of the inverter INV by predicting the controllability of the motor-generator 10 based on the MPC for each of the plurality of switching modes of the inverter INV at an updatable timing. For this reason, if there are variations in delays between the timings of determining the switching modes of the inverter IV and the actual update timings of the inverter IV to the determined switching modes, there may be a worry about reduction in the controllability of the motor-generator 10 based on the MPC.

However, the setting of the intervals between the temporally adjacent updatable shift timings t11, t12, t13, and t14 to the period of one frame enables delays between the timings of determining the switching modes of the inverter IV and the actual update timings of the inverter IV to the determined switching modes to be substantially matched with each other. This results in reduction of the variations in the delays.

Seventh Embodiment

A signal and power transmission system according to the seventh embodiment of the present disclosure will be described with reference to FIGS. 16 to 18.

The structure and/or functions of the signal and power transmission system according to the seventh embodiment are mainly identical to those of the signal and power transmission system according to the first embodiment except for the following points. So, the different points will be mainly described hereinafter.

The signal and power transmission system according to the seventh embodiment is designed to carry out current-feedback control. The current-feedback control adjusts a command voltage as a feedback manipulated variable to the output voltage of the inverter INV, thus adjusting three-phase currents actually flowing through the respective three-phase windings of the motor-generator 10 to respective command currents.

Figure 16:
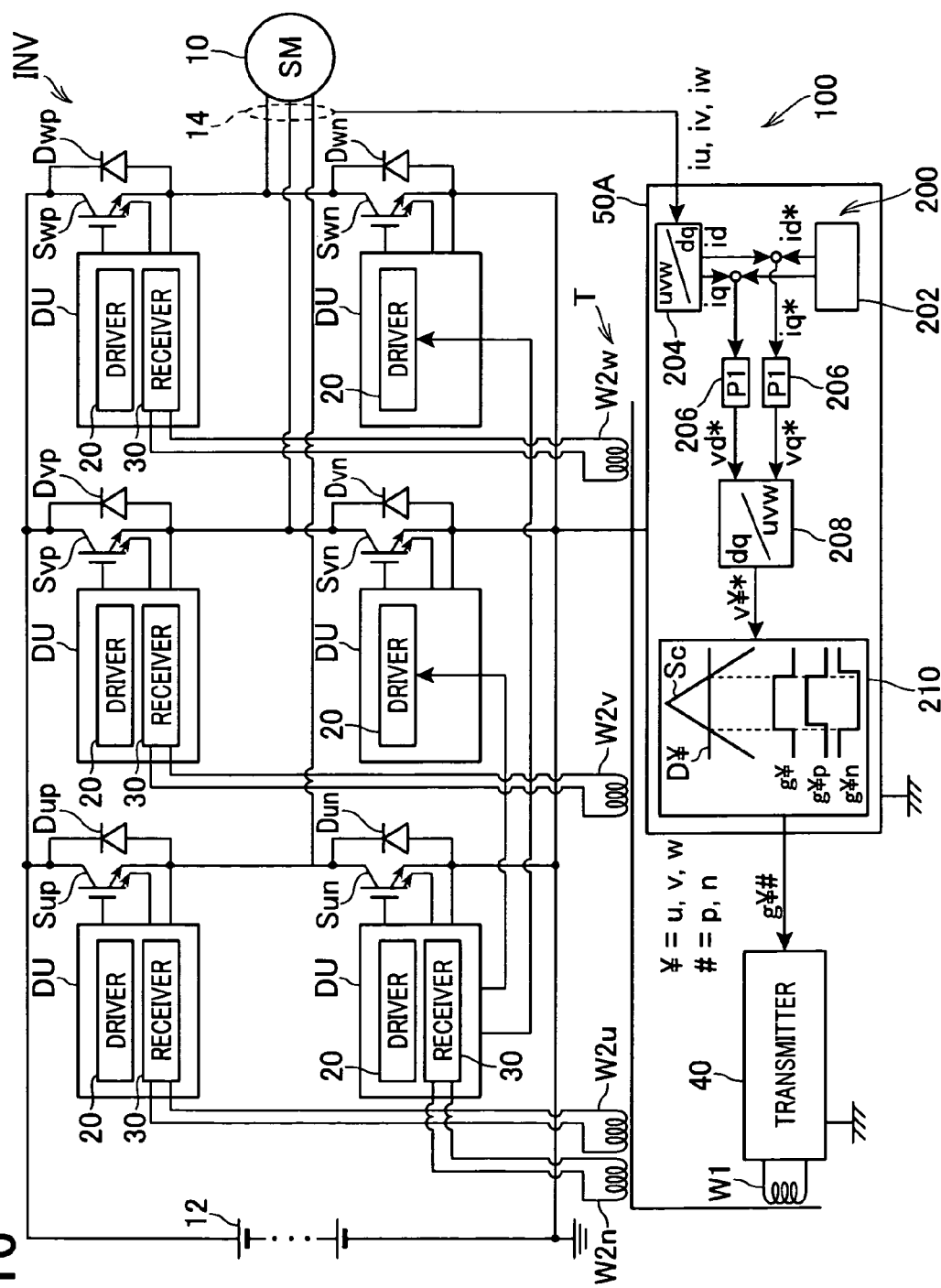
FIG. 16 is a view schematically illustrating an overall configuration of a control system for a motor-generator according to a seventh embodiment of the present disclosure.

FIG. 16 schematically illustrates a signal and power transmission system according to the seventh embodiment.

Referring to FIG. 16, an MPU 50A of the control system 100 of the signal and power transmission system is equipped with a current-feedback control module 200. The current-feedback control module 200 includes a command current setter 202, a d-q converter 204, a pair of feedback control modules 206a and 206b, a three-phase converter 208, and a drive signal generator 210.

The command current setter 202 is operative to set a command d-axis current component id* and a command q-axis current component iq* in the d-q coordinate system of the rotor based on the request torque Tr.

The d-q converter 204 is operative to convert the three-phase instantaneous current values iu, iv, and iw measured by the current sensors 14 into actual d-axis and q-axis current components id and iq in the d-q coordinate system of the rotor based on the rotational angle θ of the motor-generator 10.

The feedback control module 206a is operative to calculate a deviation Δid between the command d-axis current component idr and the actual d-axis current component id, and set, based on the deviation Δid, a command voltage vd* in the d-axis; this command voltage vd* means a feedback manipulated value for d-axis current to allow the command d-axis current component id to be matched with the measured actual d-axis current component id.

The feedback control module 206b is operative to calculate a deviation Δiq between the command q-axis current component iqr and the actual q-axis current component iq, and set, based on the deviation Δiq, a command voltage vq* in the q-axis; this command voltage vq* means a feedback manipulated value for q-axis current to allow the command q-axis current component iqr to be matched with the measured actual q-axis current component.

The three-phase converter 208 is operative to convert, based on the actual rotational angle θ, the command voltages vd* and vq* in the d-q axes into three-phase command voltages vȲ* (Ȳ=u, v, w) for the respective U-, V-, and W-phase windings of the motor-generator 10. The three-phase command voltages vȲ* correspond to, for example, substantially pseudo sinusoidal waves, respectively.

The drive signal generator 210 is operative to divide, by the half (½) level of an input voltage to the inverter INV, the command voltages v¥* to thereby generate normalized three-phase duty signals D¥, respectively.

The drive signal generator 210 is operative to perform a PWM task based on comparison in magnitude between the duty signals D¥ and a cyclic triangular carrier Sc (see the block 210), thus generating PWM signals g¥. Each of the PWM signals g¥ is a pulse signal with a controllable duty cycle (controllable pulse width). As the carrier Sc, a cyclic saw-tooth carrier signal can be used.

Then, the drive signal generator 210 is operative to delay the rising edge of each of the PWM signals g¥ by the dead time DT, thus generating high-side drive signals g¥p (see the block 210). Similarly, the drive signal generator 210 is operative to delay the rising edge of each of logically reversed signals of the PWM signals g¥ by the dead time DT, thus generating low-side drive signals g¥n (see the block 210).

Timings at which drive signals g¥# are changed depend on the resolution of the change in the carrier Sc, but can be set as substantially given timings. For example, it is assumed that the frequency of the carrier signal Sc is set to 20 KHz, so that the period of the carrier Sc is set to 50 μs. In addition, it is assumed that the change in the carrier Sc is generated based on a 10 MHz clock, the period of the 10 MHz clock corresponds to the period of transmission of an encoded pulse code signal. In these assumptions, the on or off level of at least one of the drive signals g¥# is switched to another level every 50 μs equal to 1/20 KHz, but each switch timing has a time resolution of 0.1 μs equal to 1/10 MHz.

If the period of output of frames were set to be longer than time intervals corresponding to the time resolution of 0.1 μs with output timings of frames independent of bit transitions of drive signals g¥#, there could be wide variations, among the respective phases, in delays between the bit transition timings of drive signals g¥# defined by the MPU 50A based on the time intervals and actual ON/OFF transition timings of the drive signals g¥# by the respective drive units DU. This could reduce the controllability of the command voltages v¥*, and therefore could reduce the controllability of the fundamental component of the line-to-line voltage outputted from the inverter INV.

In contrast, if the period of output of frames were set to be equivalent to time intervals corresponding to the time resolution of 0.1 μs, there could be the need to extremely increase the transmission rate of frames from the transmitter of the signal and power transmission system, which could impose excessive demands on the signal and power transmission system.

Thus, the signal and power transmission system according to the seventh embodiment is configured to synchronize the output timing of each frame with a corresponding bit transition timing of at least one drive signal in drive signals g¥#.

Figure 17:
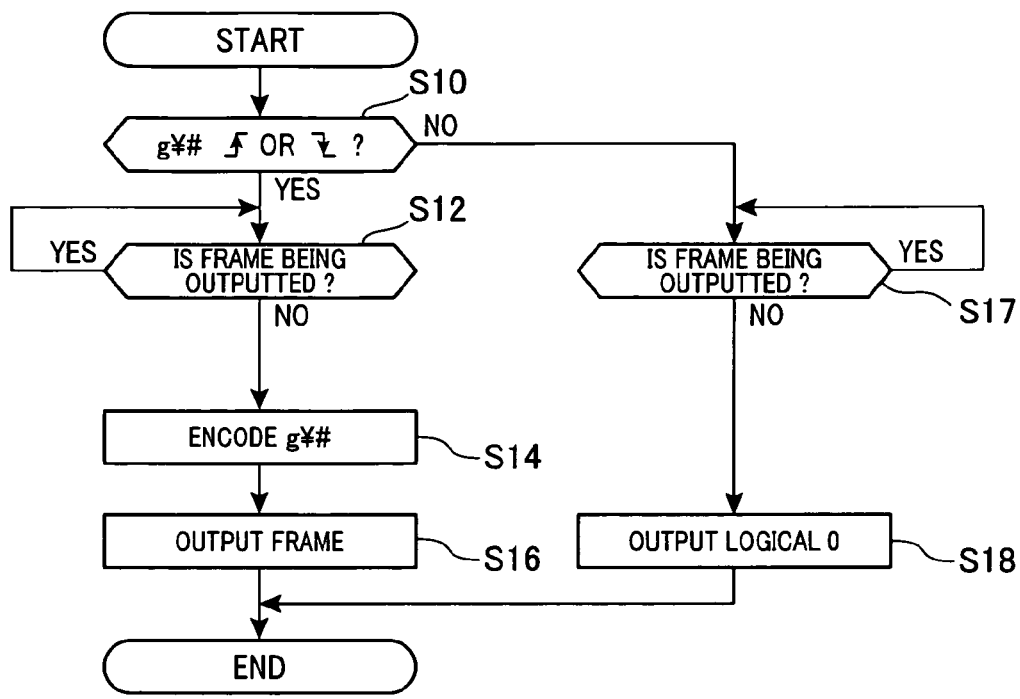
FIG. 17 is a flowchart schematically illustrating a voltage applying task to a primary coil carried out by a transmitter according to the seventh embodiment.

FIG. 17 schematically illustrates a voltage applying task to the primary coil W1 carried out by the transmitter 40 each time drive signals g¥# are inputted thereto according to this embodiment.

When starting the voltage applying task, the transmitter 40 determines whether there is an OFF-to-ON (0-to-1) transition or an ON-to-OFF (1-to-0) transition in at least one drive signal in the drive signals g¥# in step S10. This operation in step S10 serves as, for example, a transition determiner.

When determining that there is an OFF-to-ON transition or an ON-to-OFF transition in at least one drive signal in the drive signals g¥# (YES in step S10), the transmitter 40 determines whether a frame is being outputted therefrom in step S12. When determining that a frame is being outputted therefrom (YES in step S12), the transmitter 40 waits until the output of the frame is completed. After the wait or otherwise when determining that a frame is not being outputted therefrom (NO in step S12), the transmitter 40 carries out the operation in step S14. In step S14, the transmitter 40 carries out encoding of the drive signals g¥#. Thereafter, the transmitter 40 outputs, as a frame, an encoded pulse code signal containing the sync signal and the drive signals g¥# to the shift register 43, so that a voltage is applied to the primary coil W1 via the shift register 43 and the full-bridge circuit 46 in step S16. After completion of the operation in step S16, the transmitter 40 terminates the voltage applying task.

Otherwise, when determining that there are no 0-to-1 transitions or a 1-to-0 transitions in the drive signals g¥# (NO in step S10), the transmitter 40 determines whether a frame is being outputted therefrom in step S17. When determining that a frame is being outputted therefrom (YES in step S17), the transmitter 40 waits until the output of the frame is completed. After the wait or otherwise when determining that a frame is not being outputted therefrom (NO in step S17), the transmitter 40 continuously outputs value 0 bits in Manchester code to the shift register 43, so that a voltage is applied to the primary coil W1 via the shift register 43 and the full-bridge circuit 46 in step S18.

The reason for continuously applying a voltage to the primary coil W1 is to supply power to the drive units DU. In addition, the reason whey to continuously output value 0 bits in Manchester code is to prevent magnetic saturation from occurring in the transformer T due to the voltage applying process for power supply to the drive units DU. Note that value 0 bits are identical to the first bit 0 of the sync signal. This allows the transmitter 40 to output value 1 bits when switching to output of a frame, thus immediately outputting a frame. In step S18, if new drive signals g¥# are inputted thereto, the transmitter 40 stops output of value 0 bits, and carries out the operation in step S10 and the following operations.

Next, technical effects achieved by the signal and power transmission system according to this embodiment will be described with reference to FIG. 18.

Figure 18:
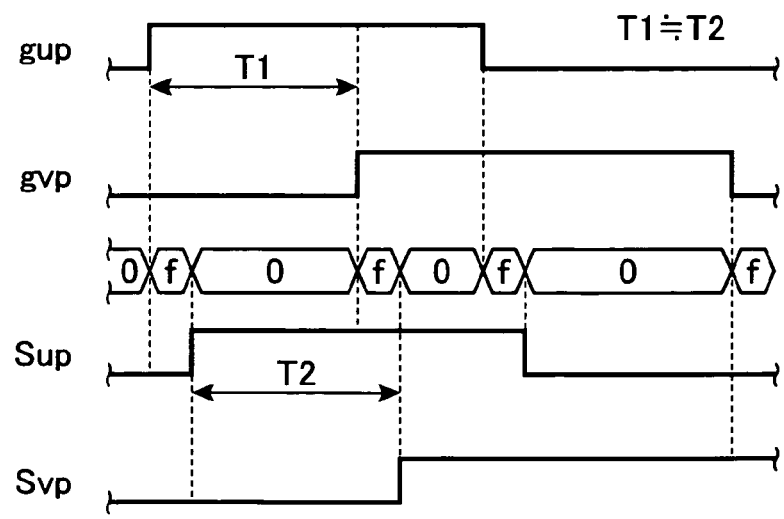
FIG. 18 is a timing chart schematically illustrating how drive signals are changed in drive units as how the state of switching elements is changed according to the seventh embodiment.

FIG. 18 schematically illustrates how drive signals g¥# are changed in the drive units DU as how the state of switching elements S¥# is changed.

Referring to FIG. 18, there is a delay between the timing of OFF-to-ON transition in the U-phase upper-arm drive signal gup and the actual OFF-to-ON switching timing of the switching element Sup by the corresponding drive unit DU. However, the configuration of the transmitter 40 allows the delay to be substantially equivalent to a delay between the timing of OFF-to-ON transition in the V-phase upper-arm drive signal guy and the actual OFF-to-ON switching timing of the switching element Suv by the corresponding drive unit DU.

Thus, the configuration of the transmitter 40 makes the time interval T1 between the timing of OFF-to-ON transition in the U-phase upper-arm drive signal gup and that in the V-phase upper-arm drive signal guy identical to the time interval T2 between the actual OFF-to-ON switching timing of the switching element Sup by the corresponding drive unit DU and that of the switching element Suv by the corresponding drive unit DU.

Thus, it is possible to adjust the fundamental component of the line-to-line voltage outputted from the inverter INV to a value determined based on the command voltages v¥*.

Eighth Embodiment

A signal and power transmission system according to the eighth embodiment of the present disclosure will be described with reference to FIG. 20.

The structure and/or functions of the signal and power transmission system according to the eighth embodiment are mainly identical to those of the signal and power transmission system according to the second embodiment except for the following points. So, the different points will be mainly described hereinafter.

Figure 19:
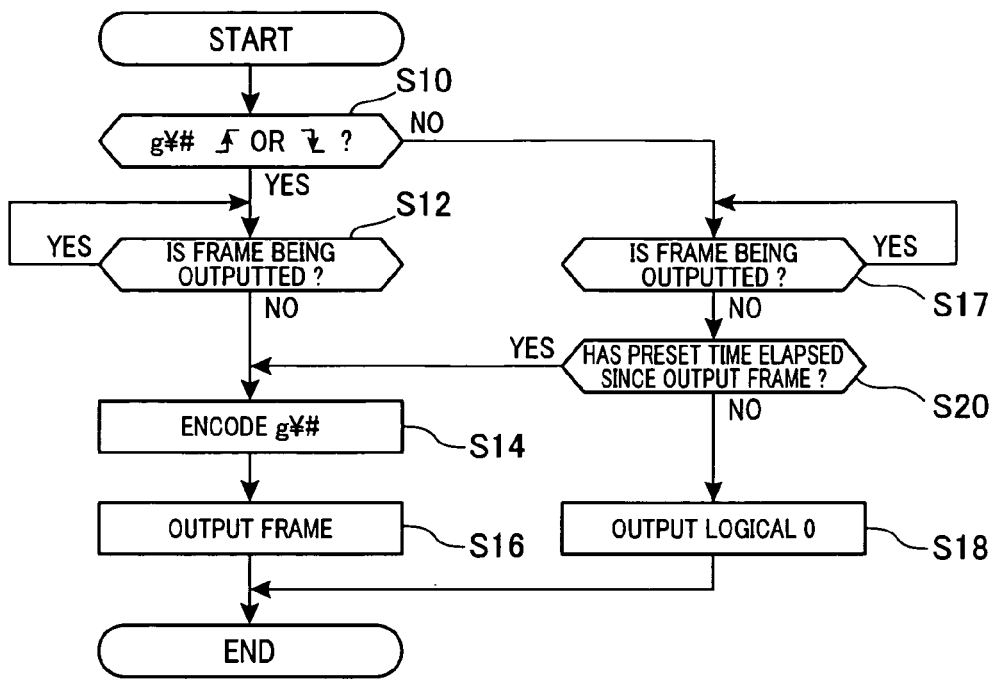
FIG. 19 is a flowchart schematically illustrating a voltage applying task to a primary coil carried out by the transmitter according to an eighth embodiment of the present disclosure.

Particularly, the transmitter 40 of the signal and power transmission system according to this embodiment is designed to carry out a voltage applying task to the primary coil W1 each time drive signals g¥# are inputted thereto. The voltage applying task according to this embodiment illustrated in FIG. 19 is partially different from the voltage applying task according to the seventh embodiment. In the voltage applying task according to the eighth embodiment, like steps to the voltage applying task according to the seventh embodiment, to which like step numbers are assigned, are omitted or simplified to avoid redundant description.

Referring to FIG. 19, after the wait of otherwise, when determining that a frame is not being outputted therefrom (NO in step S17), the transmitter 40 determines whether a preset time has elapsed since the output of the previous frame in step S20. In this embodiment, the preset time is determined to be shorter than the preset timeout value for the watchdog timer 96.

When determining that the preset time has elapsed since the output of the previous frame (YES in step S20), the transmitter 40 carries out the operation in step S14 and the following operation in step S16. That is, the operations in steps S20, S14, and S16 serve as, for example, a resending unit.

In step S14, the transmitter 40 carries out encoding of the drive signals g¥#. Thereafter, the transmitter 40 outputs, as a frame, an encoded pulse code signal containing the sync signal and the drive signals g¥# to the shift register 43, so that a voltage is applied to the primary coil W1 via the shift register 43 and the full-bridge circuit 46 in step S16.

Otherwise, when determining that the preset time has not elapsed yet since the output of the previous frame (NO in step S20), the transmitter 40 carries out the operation in step S18.

The operation in step S20 is to determine whether to transmit a frame having information about drive signals g¥# identical to information thereabout included in the previous frame. If an error in frame transmission occurred in the signal and power transmission system, this operation could make the signal and power transmission system recover from such an error as soon as possible.

Specifically, in the signal and power transmission system, if at least one of the enabling signal and the clock signal CLK has not been inputted to the AND circuit 94 for the preset timeout value, the watchdog timer 96 resets the drive-signal output circuit 84, thus forcibly turning off a corresponding switching element S¥#. Thus, if it is determined that the preset time has elapsed since the output of the previous frame due to an error in frame transmission (YES in step S20), the inverter INV could be deactivated.

However, in this embodiment, the preset time is determined to be shorter than the preset timeout value for the watchdog timer 96. For this reason, if it is determined that the preset time has elapsed since the output of the previous frame due to an error in frame transmission (YES in step S20), the transmitter 40 judges that there is an error in frame transmission, and carries out the operations in steps S14 and S16 before the lapse of the preset timeout value. This prevents the inverter INV from being controlled to be deactivated as much as possible. The preset time used in step S20 can be longer than the length of three frames.

Ninth Embodiment

A signal and power transmission system according to the ninth embodiment of the present disclosure will be described with reference to FIGS. 20, 21A, and 21B.

The structure and/or functions of the signal and power transmission system according to the ninth embodiment are mainly identical to those of the signal and power transmission system according to the first embodiment except for the following points. So, the different points will be mainly described hereinafter.

The MPU 50 according to this embodiment is designed to use, in place of the carrier-comparison PWM task set forth above, a space-vector modulation task. The space-vector modulation task is one of plural tasks for setting an average of the variations in the output voltage of the inverter INV over a preset period to the command voltages v¥*. The space-vector modulation task is designed such that the order and execution time of the switching modes selected during the preset period is independent of limitations required for the carrier-comparison PWM task. Specifically, the space-vector modulation task improves the flexibility of selecting switching modes and setting execution time of each selected switching mode during the preset period as long as the average of the voltage vectors corresponding the selected switching modes during the preset period is matched with the command voltages v¥*.

For the space-vector modulation task, there can be OFF-to-ON (0-to-1) transitions or ON-to-OFF (1-to-0) transitions in some drive signals in the drive signals g¥#. In order to address it, the transmitter 40 of the signal and power transmission system according to this embodiment is designed to carry out a voltage applying task to the primary coil W1 each time drive signals g¥# are inputted thereto. The voltage applying task according to this embodiment is partially different from the voltage applying task according to the seventh embodiment. In the voltage applying task according to the ninth embodiment, like steps to the voltage applying task according to the seventh embodiment, to which like step numbers are assigned, are omitted or simplified to avoid redundant description.

In addition, the memory 50a of the MPU 50 stores therein allowed switching patterns and disallowed switching patterns. The allowed switching patterns represent that OFF-to-ON (0-to-1) transitions and/or ON-to-OFF (1-to-0) transitions of preselected drive signals in the drive signals g¥# are allowed to simultaneously occur. In contrast, the disallowed switching patterns represent that OFF-to-ON (0-to-1) transitions and/or ON-to-OFF (1-to-0) transitions of preselected drive signals in the drive signals g¥# are disallowed from occurring simultaneously.

Figure 20:
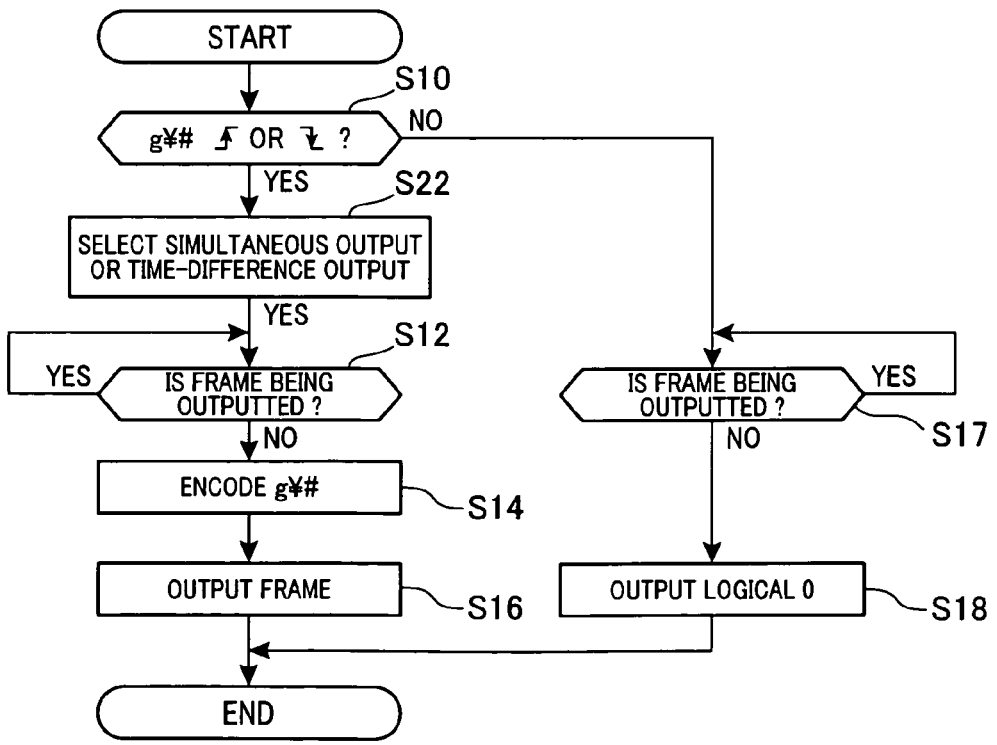
FIG. 20 is a flowchart schematically illustrating a voltage applying task to a primary coil carried out by a transmitter according to a ninth embodiment of the present disclosure.

The voltage applying task according to this embodiment illustrated in FIG. 20 is partially different from the voltage applying task according to the seventh embodiment, in the voltage applying task according to the ninth embodiment, like steps to the voltage applying task according to the seventh embodiment, to which like step numbers are assigned, are omitted or simplified to avoid redundant description.

Referring to FIG. 20, when determining that there are OFF-to-ON transitions and/or ON-to-OFF transitions in partial drive signals in the drive signals gY# (YES in step S10), the transmitter 40 carries out the operation in step S22. That is, in step S22, the transmitter 40 refers to the allowed switching patterns and the disallowed switching patterns stored in the memory 50a, and selects simultaneous output of the partial drive signals or time-difference output of the partial drive signals according to the results of the reference.

Next, the concept of the allowed switching patterns and disallowed switching patterns will be described hereinafter with reference to FIGS. 21A and 21B.

FIG. 21A schematically illustrates an allowed pattern in which the ON-to-OFF transition of the switching element Sup and the OFF-to-ON transition of the switching element Svp are allowed to simultaneously occur. FIG. 21B schematically illustrates a disallowed pattern in which the ON-to-OFF transition of the switching element Sup and the OFF-to-ON transition of the switching element Swp are disallowed from occurring simultaneously.

Why the switching pattern illustrated in FIG. 21A is an allowed pattern, and the switching pattern illustrated in FIG. 21B is a disallowed pattern are that surges due to the switching of the switching elements gup and gvp illustrated in FIG. 21A could be lower than those due to the switching of the switching elements gup and gwp illustrated in FIG. 21B.

Specifically, when the switching element Svp is turned on immediately after the turnoff of the switching element Sup, current-flow change occurs in a limited path in a positive-side DC bus Lp connected to the drains of the high-side switching elements gY# the limited path is between the U-phase switching element Sup and the V-phase switching element Svp.

In contrast, when the switching element Swp is turned on immediately after the turnoff of the switching element Sup, current-flow change occurs in a limited path in the positive-side DC bus Lp; the limited path is between the U-phase switching element Sup and the W-phase switching element Swp.

As apparent by comparison between FIG. 21A and FIG. 21B, the limited path in which current-flow change occurs between the U-phase switching element Sup and the W-phase switching element Swp is longer than that in which current-flow change occurs between the U-phase switching element Sup and the V-phase switching element Svp. For this reason, parasitic inductance of the limited path between the U-phase switching element Sup and the W-phase switching element Swp is estimated to be high, resulting in high surges in the limited path between the U-phase switching element Sup and the W-phase switching element Swp.

However, in this embodiment, when there are an ON-to-OFF transition in the drive signal gup and an OFF-to-ON transition of the drive signal gwp in the drive signals gY# (YES in step S10), the transmitter 40 refers to the memory 50a, and recognizes that this pattern is included in the disallowed patterns stored in the memory 50a in step S22. Then, the transmitter 40 selects time-difference output of the drive signals gup and gwp in step S22.

At that time, the transmitter 40 outputs, to the shift register 43, a frame including the drive signal gup without including the drive signal gwp, and thereafter, outputs, to the shift register 43, a frame including the drive signal gwp in step S16 (see FIG. 21B). In contrast, when there are an ON-to-OFF transition in the drive signal gup and an OFF-to-ON transition of the drive signal gvp in the drive signals gY# (YES in step S10), the transmitter 40 refers to the memory 50a, and recognizes that this pattern is included in the allowed patterns stored in the memory 50a in step S22. Then, the transmitter 40 selects simultaneous output of the drive signals gup and gvp in step S22. Thus, the transmitter 4 outputs, to the shift register 43, a frame including the drive signal gup and drive signal gwp (see FIG. 21A).

Accordingly, the signal and power transmission system according to this embodiment maintains, at low levels, surges due to execution of the space-vector modulation task.

Tenth Embodiment

A signal and power transmission system according to the tenth embodiment of the present disclosure will be described with reference to FIG. 22.

The structure and/or functions of the signal and power transmission system according to the tenth embodiment are mainly identical to those of the signal and power transmission system according to the eighth embodiment except for the following points. So, the different points will be mainly described hereinafter.

The transmitter 40 of the signal and power transmission system according to this embodiment is configured to selectively apply one of opposite polarity voltage values, referred to a positive voltage value and a negative voltage value, to the primary coil W1 via the shift register 43 and the full-bridge converter 46 during no-frame transmission periods. The positive voltage value corresponds to a high level in the second half of a bi-phase mark code, such as a Manchester code and the negative voltage value corresponds to a low level in the first half of a bi-phase mark code.

Figure 22:
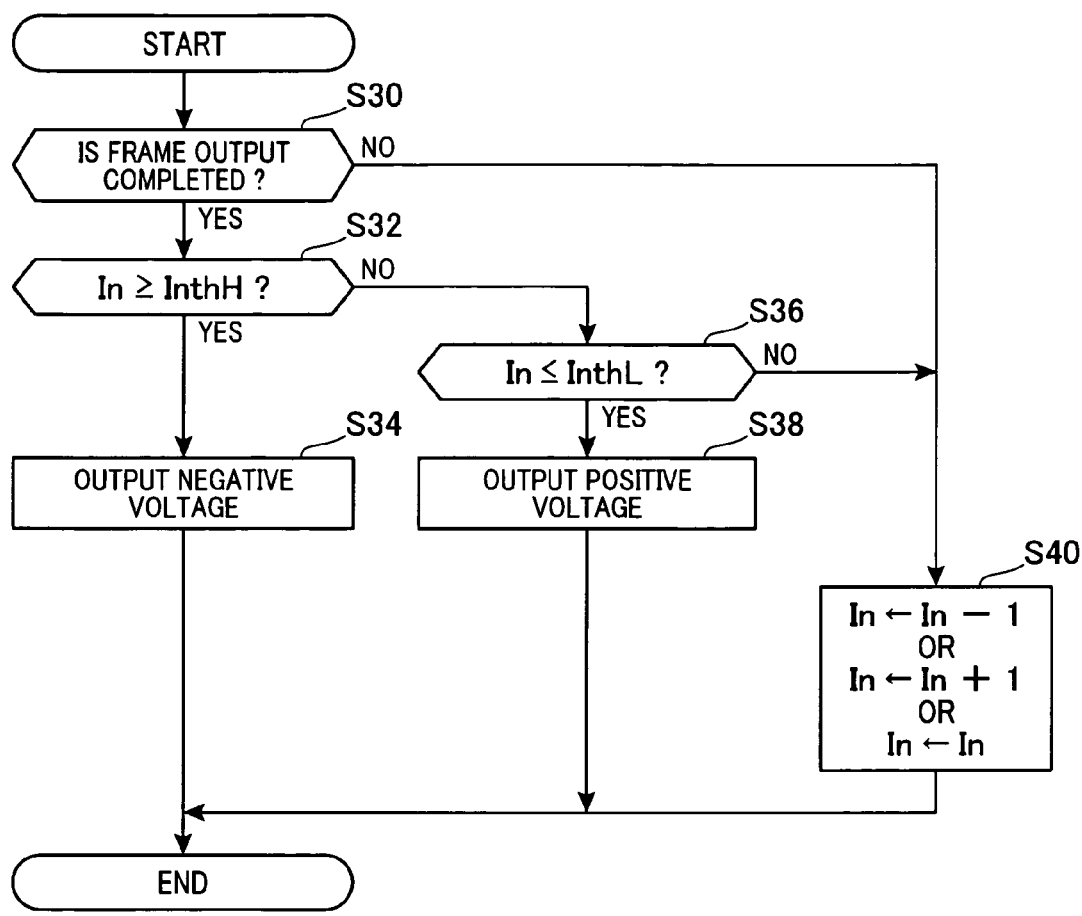
FIG. 22 is a flowchart schematically illustrating a flowchart schematically illustrating a voltage applying task to a primary coil carried out by the transmitter according to a ninth embodiment of the present disclosure.

FIG. 22 schematically illustrates a voltage applying task to the primary coil W1 carried out by the transmitter 40 during no-frame transmission periods.

When starting the voltage applying task, the transmitter 40 determines whether there is a timing immediately after completion of the output of a frame in step S30. When determining that there is a timing immediately after completion of the output of a frame (YES in step S30), the transmitter 40 determines whether an integrated value In is equal to or higher than an upper limit InthH in step S32. The integrated value In is a parameter positively correlated with magnetic flux in the transformer T, and is equivalent to temporally integrated voltages applied to the primary coil W1 described later. The upper limit InthH is determined based on an upper limit of magnetic flux that can be induced in the transformer T; the transformer T is not magnetically saturated in its positive direction as long as magnetic flux induced therein is lower than the upper limit.

When determining that the integrated value In is equal to or higher than the upper limit InthH (YES in step S32), the transmitter 40 applies the negative voltage value to the primary coil W1 of the transformer T, terminating the voltage applying task in step S34. For example, in step S34, the transmitter 40 outputs a logical 0 (0 bit) to each of the driver 44 and the inverter driver 45, thus applying a negative voltage VA, which is equivalent to the negative voltage value, to the primary coil W1. The operation in step S34 serves as, for example, a predetermined voltage applying unit.

Otherwise, when determining that the integrated value In is lower than the upper limit InthH (NO in step S32), the transmitter 40 determines whether the integrated value In is equal to or lower than a lower limit InthL in step S32. The lower limit InthL is determined based on a lower limit of magnetic flux that can be induced in the transformer T; the transformer T is not magnetically saturated in its negative direction as long as magnetic flux induced therein is higher than the lower limit.

When determining that the integrated value In is equal to or lower than the lower limit InthL (YES in step S36), the transmitter 40 applies the positive voltage value to the primary winding W1 of the transformer T, terminating the voltage applying task in step S38. For example, in step S38, the transmitter 40 outputs a logical 1 (1 bit) to each of the driver 44 and the inverter driver 45, thus applying a positive voltage VA, which is equivalent to the positive voltage value, to the primary coil W1. The operation in step S38 serves as, for example, a predetermined voltage applying unit.

Otherwise, when determining that there is not a tinning immediately after completion of the output of a frame (NO in step S30) or that the integrated value In is higher than the lower limit InthL (NO in step S36), the transmitter 40 carries out the operation in step S40. That is, the operations in step S32 and S36 serve as, for example, a reversing unit, and the operation in step S40 serves as, for example, a magnetic-flux calculator.

In step S40, the transmitter 40 updates the present integrated value In. If the negative determination has been carried out in step S30 or S36 after the operation in step S34, the transmitter 40 decrements the present integrated value In by a preset value, such as 1, because the operation in step S34 cancels the magnetic flux in the positive direction in the transformer T. In contrast, if the negative determination has been carried out in step S30 or S36 after the operation in step S38, the transmitter 40 increments the present integrated value In by a preset value, such as 1, because the operation in step S38 cancels the magnetic flux in the negative direction in the transformer T. Note that the transmitter 40 does not update the present integrated value In while transmitting a frame because the average of the voltages applied to the primary coil W1 during transmission of a frame becomes zero.

The signal and power transmission system according to this embodiment makes it possible to continuously supply power to the drive units DU.

Eleventh Embodiment

A signal and power transmission system according to the eleventh embodiment of the present disclosure will be described with reference to FIG. 23.

The structure and/or functions of the signal and power transmission system according to the eleventh embodiment are mainly identical to those of the signal and power transmission system according to the first embodiment except for the following points. So, the different points will be mainly described hereinafter.

The signal and power transmission system according to this embodiment is configured to transmit signals and power to a state monitoring system for fuel cell systems.

Figure 23:
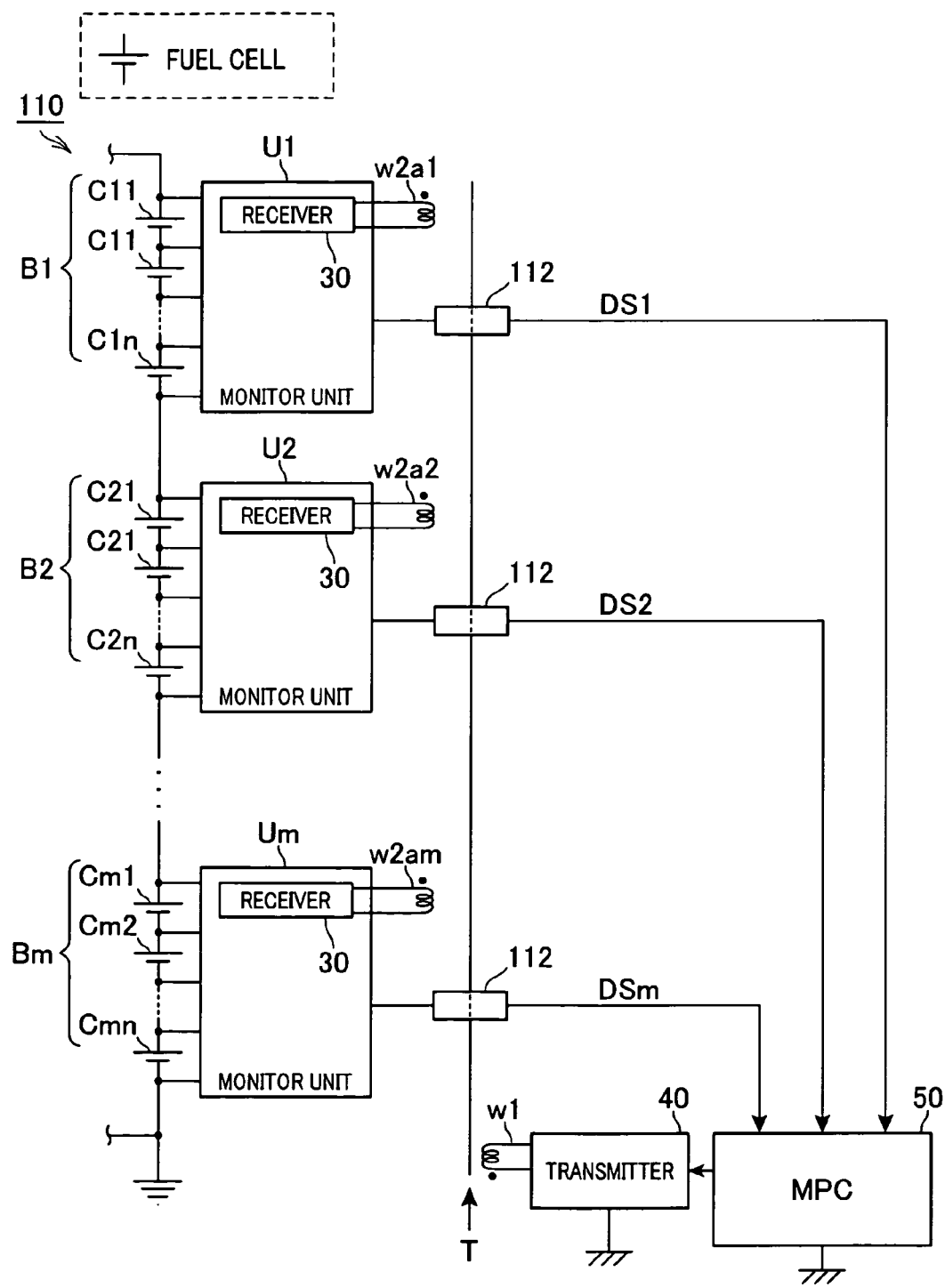
FIG. 23 is a view schematically illustrating an overall configuration of a state monitoring system for a fuel cell system according to an eleventh embodiment of the present disclosure.

Referring to FIG. 23, a battery pack 110 serves as a power source for a motor-generator (not shown) installed in a motor vehicle as a main engine. The battery pack 110 has the terminal voltage equal to or higher than 100 V. The battery pack 110 is comprised of a plurality of fuel cells Cij (i=1 to m, j=1 to n) connected in series in the form of fuel cell stack. The fuel cells Cij are identical in specifications, so that their terminal voltages are identical to each other except for their individual differences and/or their aging. The fuel cells Cij is grouped into a plurality of blocks Bi (B1 to Bm) consisting of adjacent n cells each. The state of each of the blocks Bi is monitored by a corresponding one of a plurality of monitor units Ui (U1 to Um).

The negative-terminal potential of the battery pack 110 is set to be different from the potential of the body of the motor vehicle. Each of the monitor units Ui is operative to diagnose whether there is an abnormal voltage across at least one of the cells Ci1 to Cin of a corresponding block Bi according to instruction signals sent from the MPU 50. Each of the monitor unit Ui is also operative to output, to the MPU 50, a signal indicative of the results of diagnosis via a corresponding photo coupler 112 to the MPU 50.

The MPU 50 is operative to send, to the transmitter 40, instruction signals Si for the respective monitor units Ui. The transmitter 40 is operative to encode, based on digital baseband encoding, the instruction signals Si, that is, binary logic (0 or 1) signals sent from the MPU 50 into a pulse code signal, and supply a voltage based on the pulse code signal to the primary coil W1 of the transformer T. As a result, pulsed voltage signals are induced in respective secondary coils $W2a1, W2a2, \ldots ,$ and $W2m$ respectively connected to the monitor units $U1, U2, \ldots ,$ Um. To the respective secondary coils $W2a1$ to $W2am$ are connected to the receivers 30 installed in the monitor units U1 to Um, and the pulsed voltage signals induced in the respective secondary coils $W2a1$ to $W2am$ are decoded, so that the instruction signals Si are taken out therefrom. In addition, a current flowing through each secondary coil $W2ai$ is full-wave rectified by the bridge rectifier 62 of the corresponding receiver 30, and the rectified current is smoothed by the filter circuit 64 of the corresponding receiver 30, so that a DC voltage is outputted therefrom. The output voltage (DC voltage) from the filter circuit 64 is inputted to the step-down converter 66. The output voltage is stepped down by the step-down converter 66, thus generating a power supply voltage for the elements installed in each monitor unit Ui.

As described above, the signal and power transmission system according to this embodiment enables the single transformer T to transmit instruction signals and power to the monitor units Ui. Particularly, each monitor unit Ui can operate on the power transmitted from the signal and power transmission system without on a corresponding block Bi. Thus, each monitor unit Ui can operate even if at least one cell in a corresponding block Bi stops generating power.

The first to eleventh embodiments can be changed and/or modified within the scope of the present disclosure.

In each of the first to eleventh embodiments, a Manchester code signal is used as an example of bi-phase code signals each of which is designed to have the same logical high and logical low periods, that is, has a 50% duty cycle. Thus, in place of a Manchester code signal, a differential Manchester code signal or the like can be used. Bi-phase code signals are not limited to a code signal having the same logical high and low periods, that is, 50% duty cycle. Specifically, bi-phase NRZ code signal or a CMI signal can be used in place of a Manchester code signal. A pulse code signal is not limited to a binary code signal, and an AMI pulse code signal, a 8b/10b code signal, a 6b/8b code signal, a PR4 code signal, and other similar code signals can be used as a pulse code signal.

In each of the first to tenth embodiments, a hardware means, such as the encoder 41, is configured as an encoding means for encoding drive signals g¥# into a pulse code signal in addition to a software means, such as the MPU 50 for generating drive signals g¥#. However, the present disclosure is not limited to the configuration. Specifically, the software means or another software means can be configured as an encoding means for encoding drive signals g¥# into a pulse code signal.

Figure 24A:
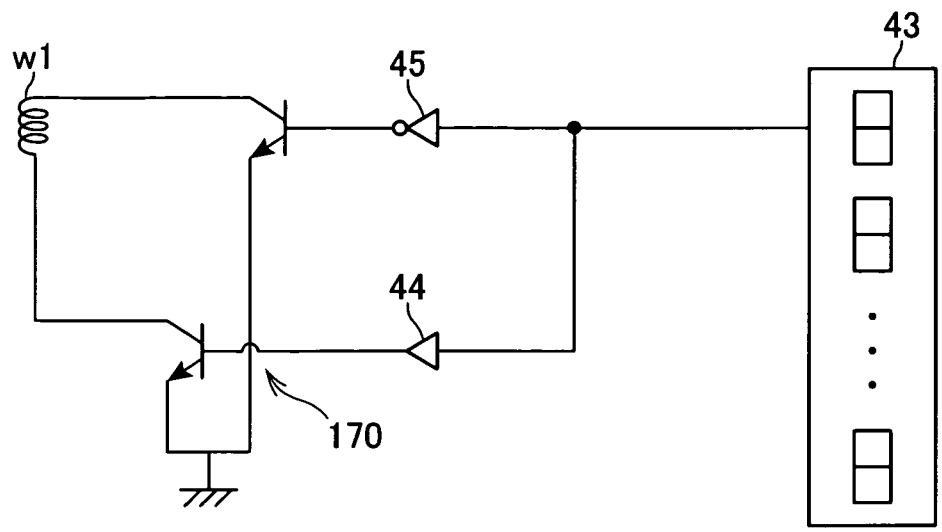
FIG. 24A is a circuit diagram schematically illustrating a modification of a voltage applying means according to each of the first to eleventh embodiments.
Figure 24B:
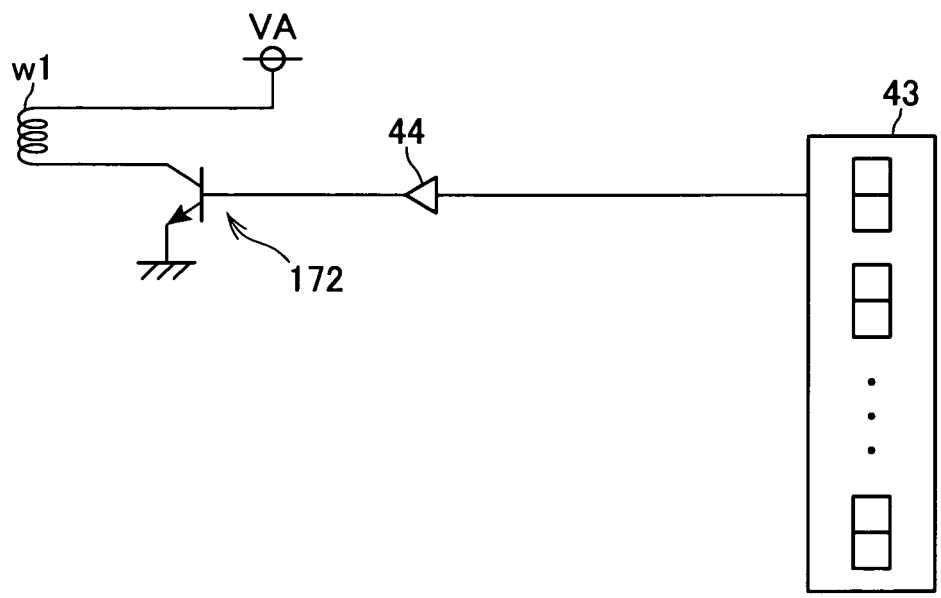
FIG. 24B is a circuit diagram schematically illustrating another modification of the voltage applying means according to each of the first to eleventh embodiments.

In each of the first to eleventh embodiments, a voltage applying means for applying a voltage to the primary coil W1 of the transformer T is equipped with the full-bridge converter 46, but the present disclosure is not limited thereto. Specifically, referring to FIG. 24A, the voltage applying means can be designed using a push-pull circuit 170, or referring to FIG. 24B, the voltage applying means can be designed using a single switching element 172 mounted on a loop path between the primary coil W1 and the shift register 43. With the voltage applying means, the single switching element 172 is turned on or off via the driver 45 according to a pulse code signal supplied from the shift register 43, so that a voltage is induced in the primary coil W1.

For example, in each of the first embodiment (see FIG. 1) and the second embodiment (see FIG. 9), the receiver 30 can be installed in the drive unit DU provided for each of the lower-arm switching elements S¥n. In this modification, secondary coils connected to the receivers 39 provided for the respective lower-arm switching elements S¥n can be formed by different members. This makes it possible to drive the switching elements S¥n without being subjected to the influence of variations in the ground potential of the drive unit DU for each of the lower-arm switching elements S¥n due to voltage drop in the negative side DC bus.

In each of the fourth embodiment (see FIG. 13) and the fifth embodiment (see FIG. 14), the receiver 30 can be installed in the drive unit DU provided for any one of the lower-arm switching elements S¥n.

As the sync signal, another sync signal can be used. Particularly, if both upper- and lower-arm switching elements of one leg can be simultaneously turned on, change of design of the sync signal is important. For example, as disclosed in U.S. Pat. No. 7,130,205 or Japanese Patent Application Publication No. 2009-141989, an impedance network is connected between an inverter and a battery, and simultaneous turn-on (shoot-through) of both upper- and lower-arm switching elements of one leg of the inverter boosts an input voltage to the inverter. In this case, the dead time can be generated by the receivers 30, and drive signals g¥p and gin can be determined such that the upper- and lower-arm switching elements of each leg are not simultaneously turned off. Thus, the sync signal can be designed to include three or more successive bits of 0 because six-bit data expressing the drive signals g¥# cannot contain three-successive bits of 0. The sync signal can be designed as the train of pulses each of which does not express any one of logical 0 and logical 1.

Target signals to be transmitted from the transmitter 40 to the drive unit DU cannot include a sync signal. In this modification, a transformer can be provided to transmit a signal representing the head of a frame. This configuration easily performs the decoding process.

In the first embodiment, an information signal to be encoded can be designed as a signal for representing any one of the plurality of switching modes, and the dead-time generating function can be installed in each of the receivers 30.

In the second embodiment (see FIG. 9), if at least one of the enabling signal and the clock signal CLK has not been inputted to the AND circuit 94 for the length of time taken to transmit three frames as the timeout value, the watchdog timer 96 resets the drive-signal output circuit 84, thus forcibly turning off a corresponding switching element S¥#. However, the present disclosure is not limited to the configuration. Specifically, the length of time of one frame or two frames can be set to the timeout value. In addition, if at least one of the enabling signal and the clock signal CLK has not been inputted to the AND circuit 94 for the timeout value, the watchdog timer 96 can maintain the previous on/off states of the switching elements S¥#, and provide notification of a fault to an external unit, such as the MPU 50.

In each of the first to eleventh embodiments, the over-current protection circuit 102 operative to monitor whether a current flowing through the switching element Sup is as an overcurrent is used as a monitoring means, but the monitoring means is not limited thereto. Specifically, a means for monitoring the temperature of each switching element S¥# or a means for externally outputting information indicative of the temperature of each switching element S¥# can be used as a monitoring means.

In place of the full-bridge rectifier 62, another type of known rectifiers can be used.

Each of the secondary coils W2n, W2n, W2v, and W2w has a center tap, and a voltage between the center tap and one end of each of the secondary coils W2n, W2n, W2v, and W2w can be used as an input voltage signal to the decoder 70 of a corresponding one of the decode units DU. In this modification, a conversion means, such as a data slicer 72, for reducing the variation in the voltage signal inputted to the decoder 70. In addition, if a power source voltage required for the decode unit DU is low or a step-up converter is provided at the output side of the bridge rectifier 62, the conversion means can be eliminated.

A decoding means, such as the decoder 70, which is connected in parallel to the rectifier 72, but can be connected in series thereto. The decoding means, such as the decoder 70, can be connected between the center tap and one end of each of the secondary coils W2n, W2n, W2v, and W2w.

The filter circuit 64 can be designed as a first-order lag filter.

The MPU 50 can perform known DTC (Direct Torque Control), in place of or in addition to the MPC for updating the switching mode of the inverter INV. The DTC is designed to calculate an estimate of the motor-generator's magnetic flux and torque based on the measured current value in the motor-generator 10, and directly control the torque of the motor-generator 10 based on the calculated estimate.

In the sixth embodiment (see FIG. 15), each interval between the temporally adjacent updatable shift timings t1, t2, t3, and t4 are set to the period of one frame, but an integer submultiple of each interval between the temporally adjacent updatable shift timings t1, t2, t3, and t4 can be set to the period of one frame.

Even for the MPG, it is unnecessary to output a frame every preset period. For example, it is possible to synchronize the output timing of each frame with a corresponding switching-mode transition timing of the inverter INV. Actually, in this modification, the signal and power transmission system is configured to output two frames every time the switching mode of the inverter INV is shifted to another because the on/off state of an upper-arm switching element and that of a lower-arm, switching element are shifted with the dead time DT therebetween.

In step S20, the preset time can be set to be shorter than an allowable upper limit of upper- and lower-arm switching elements of a corresponding leg being short-circuited if the signal and power transmission system is designed without using the watchdog timer 96 like the system according to the first embodiment.

In the seventh embodiment, the operation in step S10 for determining whether there is an OFF-to-ON (0-to-1) transition or an ON-to-OFF (1-to-0) transition in at least one drive signal in the drive signals g¥# in step S10 can be designed as a hardware means, such as the transmitter 40, or a software means. If the determination is designed as a software means, it is desirable to set the period to sample one frame to be lower than the length of time of one frame.

In the seventh embodiment, the operations in steps S12 to S16 can be designed as a hardware means, such as the transmitter 40, or a software means.

In the ninth embodiment (see FIGS. 20 and 21), the memory 50a of the MPU 50 stores therein the allowed switching patterns and the disallowed switching patterns, but can store therein any one of the allowed switching patterns and the disallowed switching patterns.

In the ninth embodiment (see FIGS. 20 and 21), the transmitter 40 is designed to allow simultaneous switching of plural switching elements if the corresponding pattern is stored as one of the allowed patterns in the memory 50a, but can be designed to uniformly limit a predetermined number of switching elements to be simultaneously switched even if the corresponding pattern is stored as one of the allowed patterns in the memory 50a.

In step S34 or S38, the transmitter 40 applies the positive voltage value or the negative voltage value consisting of a pulse code signal to the primary coil W1, but can apply another voltage value to the primary coil W1. For example, the transmitter 40 can apply a voltage having predetermined first absolute value and first polarity to the primary coil W1 in step S34, and apply a voltage having the same first polarity but an second absolute value different from the first absolute value in step S38.

In step S40, the transmitter 40 quantifies the amount of magnetic flux in the transformer T using the period during which voltages each having the same polarity are applied, but the present disclosure is not limited thereto. Specifically, if the transmitter 40 applies a voltage having predetermined first absolute value and first polarity to the primary coil W1 in step S34, and applies a voltage having the same first polarity but an second absolute value different from the first absolute value in step S38, it is desirable for the transmitter 40 to quantify the amount of magnetic flux in the transformer T using an integrated amount of the applied voltages.

The transmitter 40 can be equipped with a zero-cross detection means for detecting, as a zero-cross point, magnetic flux in the transformer T passes through its zero. In this modification, the transmitter 40 can be designed to reverse the polarity of a voltage being applied to the primary coil W1 each time a preset time has elapsed since detection of a zero-cross point by the zero-cross detection means. The zero-cross detection means can be designed as a means for detecting changes in the polarity of a current induced in each of the secondary coils W2n, W2u, W2v, and W2w or a means for detecting when each of the bridge-connected diodes 62a of the bridge rectifier 62 is changed from its non-conducting state to its conducting state.

In step S34 or S38, the transmitter 40 allows change of the polarity of a voltage applied to the primary coil W1 immediately after completion of the output of a frame, but can allow change of the polarity of a voltage applied to the primary coil W1 if the time during which the voltage is applied to the primary coil W1 becomes relatively long.

In the seventh embodiment, when determining that a frame is not being outputted therefrom (NO in step S17), the transmitter 40 continuously outputs value 0 bits in Manchester code to the shift register 43, but can continuously output value 1 bits in Manchester code to the shift register 43.

As described as an example in the eighth embodiment, if a period during which no frames are outputted is shortened (see FIG. 19), the transmitter 40 can stop application of a voltage to the primary coil W1 because a corresponding period of power supply to the drive units DU being shut off due to the stop of voltage application is relatively short.

Target signals to be transmitted from the transmitter 40 are not limited to drive signals for switching elements of a power converter or instruction signals for monitor units for a fuel cell system. It is desirable that target signals to be transmitted from the transmitter 40 are instruction signals for instructing a target device to perform a predetermined task; the target device is not equipped with its own power source. However, as target signals to be transmitted from the transmitter 40, output signals to a system equipped with its power source can be effectively used. For example, in the eleventh embodiment (see FIG. 23), if secondary cells, such as lithium ion cells and nickel-hydrogen cells, are used as the cells Cij, each of the monitor units Ui can operate on a corresponding one of the cells Cij. However, in this case, if there are variations in electric requirements of the monitor units U1 to Um due to their individual differences, there may be variations in power consumption of the cells Ci1 to Cin. This may result in variations in their charging rates and terminal voltages of the cells Ci1 to Cin. In contrast, the signal and power transmission system illustrated in FIG. 23 can solve these problems.

If the reference potential of a high-voltage system, that is, the negative voltage of the high-voltage battery 12 is identical to the reference voltage of a low-voltage system, that is, the potential of the body of the motor vehicle, the primary coil W1 and the secondary coil W2n can be connected to each other. However, it is desirable that they are not connected to each other in order to reduce the influence of voltage drop in the positive or negative DC bus of the inverter INV.

In each of the first to eleventh embodiments, a plurality of secondary coils are used, but a single secondary coil can be used depending on the structure of a target device to which target signals are to be transmitted.

In the fifth embodiment (see FIGS. 10 to 12), shiftable timings of the on/off states of the converter CNV and those of the inverters INVa and INVb can be different from each other (see FIG. 12), and shiftable timings of the on/off states of the respective inverters INVa and INVb can be identical to each other.

Shiftable timings of the on/off states of one leg (one phase) of the inverter INV can be different from those of the on/off states of another leg (another phase) of the inverter INV using the methods descried in the third to fifth embodiments. In each of the first to tenth embodiments, one leg of the inverter INV is comprised of a pair of high-side and low-side switching elements S¥p and S¥n.

One member of the inverter INV, whose shiftable timings of the on/off states are different from those of the on/off states of another member of the inverter INV, is not limited to one leg (one phase) of the inverter INV. In addition, an object of the structure that shiftable timings of the on/off states of one member of the inverter INV are different from those of the on/off states of another member of the inverter INV is not limited to reduction of the likelihood of the occurrence of surges.

For example, it is assumed that a signal and power transmission system according to the present disclosure is applied to a known step-up chopper comprised of multiple members each consisting of a series-connected high-side diode and low-side switching element. In this assumption, for multiple parallel drive of the multiple members of the step-up chopper, shiftable timings of the on/off states of the low-side switching element of one of the multiple members can be different from those of the on/off states of the low-side switching element of another member for multi-phase drive of the multiple members.

A set of parallelly-connected high-side switching elements SÝp and a set of parallelly-connected low-side switching elements SÝn of each leg (each phase) of the inverter INV can be used. In this modification, the parallelly-connected high-side switching elements SÝp of each phase can share a common receiver 30.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A signal and power transmission system comprising:
   a transformer comprising a primary coil and a secondary coil magnetically coupled to the primary coil and connected to a first electrical path;
   an encoder configured to encode a target signal to be transmitted to produce a pulse code signal;
   a voltage applying unit configured to apply a voltage signal based on the pulse code signal to the primary coil as an input voltage signal;
   a decoder configured to decode an output voltage signal induced in the secondary coil using a variation in the output voltage signal into a decoded signal corresponding to the target signal, the output voltage signal being induced in the secondary coil based on the input voltage signal; and
   a rectifier configured to rectify a current flowing through the first electrical path connected to the secondary coil according to the output voltage signal induced in the secondary coil, thus outputting a rectified current as power
   wherein:
   the secondary coil is provided in plurality, and the decoder is provided in plurality for the respective secondary coils;
   the secondary coils are connected to a plurality of respective drive units;
   each of the drive units is configured to drive a corresponding one of a plurality of switching elements, the drive units respectively operating on different operating potentials;
   the rectifier is provided in plurality,
     the plurality of rectifiers being provided for the respective secondary coils,
     each of the rectifiers outputting the rectified current to a corresponding one of the drive units,
     the target signal including an on/off instructions signal for turning on or off the respective switching elements;
   the decoder is provided in plurality for the respective secondary coils; and
   each of the decoders extracts, from the on/off instruction signals, an on/off instruction signal for a corresponding one of the drive units, and outputs the extracted on/off instruction signal to a corresponding one of the drive units.

2. The signal and power transmission system according to claim 1, wherein:
   the first electrical path is provided in plurality,
   each of the decoders is connected to a corresponding one of the secondary coils via a corresponding one of the second electrical paths, and
   each of the rectifiers is connected to a corresponding one of the secondary coils via a corresponding one of the first electrical paths, the second electrical paths being different from the first electrical paths.

3. The signal and power transmission system according to claim 1, wherein the target signal includes an information signal to be transmitted and a synchronous signal indicative of a start of the information signal.

4. The signal and power transmission system according to claim 1, wherein the encoder is configured such that a variation in interlinkage flux to the primary coil and each of the secondary coils averages to zero over a period, the interlinkage flux being based on the input voltage signal applied to the primary coil, the period corresponding to a length of time taken to transmit the pulse code signal.

5. The signal and power transmission system according to claim 1, wherein the pulse code signal is a bi-phase code signal.

6. The signal and power transmission system according to claim 1, wherein each of the decoders further comprises a clock generator configured to generate, based on the output voltage signal, a clock signal required to decode the pulse code signal.

7. The signal and power transmission system according to claim 1, further comprising a filter circuit connected to each of the rectifiers and configured to smooth the rectified current outputted from each of the rectifiers, the filter circuit having a time constant, the time constant being set to be longer than a maximum period during which a value of the output voltage signal becomes constant.

8. The signal and power transmission system according to claim 1, wherein:
   the plurality of switching elements include plural pairs of series-connected high- and low-side switching elements,
   each of the drive units is configured to drive a corresponding one of the series-connected high- and low-side switching elements of a corresponding one of the plural pairs, and
   each of the target signals includes a corresponding one of the on/off instruction signals for turning on or off a corresponding one of the series-connected high- and low-side switching elements of a corresponding one of the plural pairs.

9. The signal and power transmission system according to claim 8, wherein:
   each of the drive units include a driver configured to drive the high-side switching element of a corresponding one of the plural pairs, and
   each of the target signals includes: the on/off instruction signal for turning on or off a corresponding one of the high- and low-side switching elements of a corresponding one of the plural pairs; and a synchronous signal indicative of a start of the corresponding on/off instruction signal,
   the on/off instruction signals for the high- and low-side switching elements of each of the plural pairs are designed to prevent the high- and low-side switching elements of a corresponding one of the plural pairs from being simultaneously on, and each of the decoders is comprised of a fault detector configured to detect, when the on/off instruction signals for the high- and low-side switching elements of at least one pair are both on instructions, a fault in the target signal, the signal and power transmission system further comprising:

a fault addressing unit configured to perform a process of addressing the fault detected by the fault detector.

10. The signal and power transmission system according to claim 8, wherein:

each of the drive units includes a driver configured to drive the high-side switching element of a corresponding one of the plural pairs, each of the target signals includes: the on/off instruction signal for turning on or off a corresponding one of the high- and low-side switching elements of a corresponding one of the plural pairs; and a synchronous signal indicative of a start of the corresponding on/off instruction signal, the on/off instruction signals for the high- and low-side switching elements of each of the plural pairs are designed to prevent the high- and low-side switching elements of a corresponding one of the plural pairs from being simultaneously on, and the synchronous signal is a signal comprised of continuous three or more signals that are identical to the corresponding on instruction signal.

11. The signal and power transmission system according to claim 8, wherein:

the on/off instruction signals for the high- and low-side switching elements of one of the plural pairs is one of:

a pair of the on instruction signal for the high-side switching element and the off instruction signal for the low-side switching element, a pair of the off instruction signal for the high-side switching element and the on instruction signal for the low-side switching element, and a pair of the off instruction signals for both the high- and low-side switching elements.

12. The signal and power transmission system according to claim 11, wherein:

the high- and low-side switching elements of each of the plural pairs are complimentarily driven to be alternately turned on, and the on/off instruction signals for the high- and low-side switching elements of each of the plural pairs are designed to turn off the high- and low-side switching elements of a corresponding one of the plural pairs before one of the high- and low-side switching elements of the corresponding one of the plural pairs is turned from an off state to an on state.

13. The signal and power transmission system according to claim 8, wherein:

each of the drive units is comprised of a monitor unit for monitoring a corresponding one of the plurality of switching elements, the monitor unit being connected to a corresponding one of the rectifiers.

14. The signal and power transmission system according to claim 1, wherein:

the plurality of switching elements are divided into plural groups, each of the target signals includes the on/off instruction signal for turning on or off a corresponding one of the switching elements, and each of the decoders comprises:

a difference unit configured to, when the on/off instruction signal for one switching element in one of the plural groups and the on/off instruction for one switching element in another of the plural groups are transmitted as respective first and second on/off instruction signals, make difference between an arrival timing of the first on/off instruction signal to a corresponding one of the drive units and an arrival timing of the second on/off instruction signal to a corresponding one of the drive units.

15. The signal and power transmission system according to claim 1, wherein:

the plurality of switching elements are divided into plural groups, the signal and power transmission system further comprising:

an instruction unit configured to periodically output, to the encoder, the target signal, so that the target signal is periodically transmitted via the encoder, the voltage applying unit, the primary coil, and each of the secondary coils, the instruction unit being configured to distinguish an update period of the on/off instruction signal for each switching element in one of the plural groups form an update period of the on/off instruction signal for each switching element in another of the plural groups.

16. The signal and power transmission system according to claim 1, wherein:

the plurality of switching elements are divided into plural groups, the signal and power transmission system further comprising:

an instruction unit configured to periodically output, to the encoder, the target signal, so that the target signal is periodically transmitted via the encoder, the voltage applying unit, the primary coil, and each of the secondary coils, the target signal to be transmitted for one period including: the on/off instruction signal in one of the plural groups, and an identifier indicative of the one of the plural groups.

17. The signal and power transmission system according to claim 1, wherein:

the switching elements constitute first and second inverters connected respectively to first and second different rotating machines and connected to a common direct current power source, and one or more switching elements in the switching elements constituting the first inverter and one or more switching elements in the switching elements constituting the second inverter are included in different groups in the plural groups.

18. The signal and power transmission system according to claim 1, wherein the primary coil and the plurality of secondary coils are electrically insulated from each other.

19. The signal and power transmission system according to claim 1, further comprising:

a converter configured to reduce the variation in the output voltage signal to input the output voltage signal with the variation being reduced to each of the decoders.

20. The signal and power transmission system according to claim 1, further comprising:
an instruction unit configured to periodically output, to the encoder, the target signal,
wherein:
the encoder is configured to encode, every first period, each of the target signals periodically outputted from the instruction unit,
the plurality of switching elements constitute an inverter connected to a rotating machine,
the target signals are designed to update, every second period, a switching mode of the inverter, the switching mode being defined by on or off of each of the switching elements, and
the first period is set to be an integer submultiple of the second period.

21. The signal and power transmission system according to claim 1, further comprising:
an instruction unit configured to periodically output, to the encoder, the target signal as a plurality of target signals,
wherein:
the encoder is configured to periodically encode each of the target signals periodically outputted from the instruction unit,
the signal and power transmission system further comprising:
a transition determiner configured to determine whether there is a transition in the on/off instruction signal for at least one of the switching elements in a present target signal in the plurality of target signals outputted from the instruction unit,
the encoder being configured to, when it is determined there is a transition in the on/off instruction signal for at least one of the switching elements in the present target signal, synchronize encoding of the present target signal with the transition in the on/off instruction signal detected by the transition detector.

22. The signal and power transmission system according to claim 21, wherein:
the voltage applying unit is configured to resend the input voltage signal based on the pulse code signal previously encoded by the encoder to the primary coil if a period during which no transitions are detected in one or more of the plurality of target signals by the change detector has reached a predetermined period.

23. The signal and power transmission system according to claim 21, wherein:
when it is determined there is a transition in the on/off instruction signal for the at least one of the switching elements in the present target signal by the transition detector during the previous pulse code signal based on a previous target signal being transmitted to the secondary coil via the voltage applying unit and the primary coil, the synchronizing unit is configured to:
encode the present target signal including the on/off instruction signal with the transition detected by the transition detector to the pulse code signal after completion of transmission of the previous pulse code signal, and transmit the pulse code signal to the secondary coil corresponding to at least one of the switching elements as the output voltage signal via the voltage applying unit and the primary coil.

24. The signal and power transmission system according to claim 21, wherein:
when it is determined there are transitions in the on/off instruction signals for at least two of the switching elements in the present target signal by the transition detector, the encoder is configured to encode the present target signal with non-transition of at least one of the on/off instruction signals, thus postponing transmission of the transition of at least one of the on/off instruction signals.

25. The signal and power transmission system according to claim 21, further comprising:
a memory unit configured to memorize therein at least one of an allowed condition and a disallowed condition, the allowed condition including a condition that allows simultaneous transmission of at least part of the on/off instructions for the switching elements, the disallowed condition including a condition that disallows simultaneous transmission of at least part of the on/off instructions for the switching elements,
wherein:
when it is determined there are transitions in the on/off instruction signals for at least two of the switching elements in the present target signal by the transition detector, the encoder is configured to:
encode the present target signal with non-transition of at least one of the on/off instruction signals to postpone transmission of the at least one of the on/off instruction signals if the on/off instructions of the at least two of the switching elements meet the disallowed condition; and
encode the present target signal including the transitions of the on/off instruction signals to simultaneously transmit all the on/off instructions included in the present target signal.

26. The signal and power transmission system according to claim 22, wherein:
the voltage applying unit is configured to apply a voltage to the primary coil while alternately reversing a polarity of the voltage according to whether a predetermined condition is met during a period after application of the input voltage signal corresponding to the pulse code signal based on one target signal in the plurality of target signals to the primary coil until a next target signal is encoded by the encoder.

27. The signal and power transmission system according to claim 26, wherein:
the pulse code signal is a bi-phase code signal, and
the voltage applying unit is configured to apply, to the primary coil, the voltage corresponding to one code in the bi-phase code signal, and reverse the polarity of the voltage by applying another voltage corresponding to another code in the bi-phase code signal.

28. The signal and power transmission system according to claim 22, wherein:
the voltage applying unit further comprises:
a predetermined voltage applying unit configured to apply a predetermined voltage to the primary coil during a period after application of the input voltage signal corresponding to the pulse code signal based on one target signal in the plurality of target signals to the primary coil until a next target signal is encoded by the encoder;
a magnetic-flux calculator configured to calculate information correlated with an amount of magnetic flux induced in the primary coil and each of the secondary coils based on the predetermined voltage applied by the predetermined voltage applying unit; and
a reversing unit configured to reverse a polarity of the predetermined voltage applied by the predetermined voltage applying unit according to the information calculated by the magnetic-flux calculator.

\* \* \* \* \*